US012680522B2

(12) United States Patent
Mohlin et al.

(10) Patent No.: US 12,680,522 B2

(45) Date of Patent: Jul. 14, 2026

(54) METHOD FOR STARTING A POWER SYSTEM

(71) Applicant: Volvo Truck Corporation, Gothenburg (SE)

(72) Inventors: Anders Mohlin, Kungsbacka (SE); Malin Ehleskog, Hisings Backa (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 19/065,256

(22) Filed: Feb. 27, 2025

(65) Prior Publication Data

US 2025/0277477 A1 Sep. 4, 2025

(30) Foreign Application Priority Data

Mar. 1, 2024 (EP) .................................... 24160887

(51) Int. Cl.
*F02M 26/05* (2016.01)
*F02B 37/22* (2006.01)
(Continued)

(52) U.S. Cl.
CPC ........... *F02M 26/05* (2016.02); *F02B 37/225* (2013.01); *F02D 41/0077* (2013.01);
(Continued)

(58) Field of Classification Search
CPC ........ F02M 26/05; F02M 26/22; F02M 26/38; F02M 26/10; F02M 26/33; F02M 26/43; F02B 37/225; F02B 37/24; F02D 41/0077; F02D 41/064; F02D 2200/04; F02D 2200/70; F02D 9/04; F02D 2200/0414;
(Continued)

(56) References Cited

U.S. PATENT DOCUMENTS 6,354,084 B1 * 3/2002 Mckinley .................. F02D 9/04 60/602
7,275,367 B2 * 10/2007 Tamura ................... F02D 9/103 137/599.16

(Continued)

OTHER PUBLICATIONS

Extended European Search Report, European Patent Application No. 24160887.6, mailed Aug. 2, 2024, 10 pages.

*Primary Examiner* — Jesse S Bogue
(74) *Attorney, Agent, or Firm* — Sage Patent Group

(57) ABSTRACT

A computer system configured to receive temperature information (TI) indicative of an ambient air temperature of a power system comprising an internal combustion engine. The computer system is further configured to in response to determining that the TI indicates the ambient air temperature of the power system being equal to or below a threshold temperature, issue information to the power system to initiate a cold starting procedure comprising the following: controlling the throttle arrangement throttling exhaust gas from said internal combustion engine to a turbine wheel of a turbo, such that an exhaust gas counterpressure upstream the throttle arrangement is within a target exhaust gas counterpressure range, and controlling the first exhaust gas recirculation path valve such that an amount of nitrogen oxides in exhaust gases emitted from the internal combustion engine is within a target nitrogen oxides amount range.

19 Claims, 9 Drawing Sheets

(51) Int. Cl.

| | |
|---|---|
| ***F02D 41/00*** | (2006.01) |
| ***F02D 41/06*** | (2006.01) |
| ***F02M 26/22*** | (2016.01) |
| ***F02M 26/38*** | (2016.01) |

(52) U.S. Cl.
CPC ........... *F02D 41/064* (2013.01); *F02M 26/22* (2016.02); *F02M 26/38* (2016.02); *F02D 2200/04* (2013.01); *F02D 2200/70* (2013.01)

(58) Field of Classification Search
CPC ............. F02D 41/0065; F02D 41/1448; F02D 41/1461; F02D 41/0007
See application file for complete search history.

(56) References Cited

U.S. PATENT DOCUMENTS

| | | | | |
|---|---|---|---|---|
| 8,528,329 | B2 * | 9/2013 | Gibble ................ | F02D 41/0007 60/605.1 |
| 9,422,883 | B2 * | 8/2016 | Ge ...................... | F02D 41/0255 |
| 9,429,110 | B2 * | 8/2016 | Ulrey .................. | F02D 41/0077 |
| 9,752,521 | B2 * | 9/2017 | Dudar ................ | F02M 25/0836 |
| 10,094,310 | B2 * | 10/2018 | Ulrey .................. | F02D 13/0261 |
| 10,393,041 | B2 * | 8/2019 | Ulrey .................. | F02D 41/0077 |
| 10,711,672 | B2 * | 7/2020 | Ulrey ..................... | F02M 26/07 |
| 10,724,452 | B2 * | 7/2020 | Dods ..................... | F02D 41/146 |
| 2009/0126345 | A1 | 5/2009 | Greszler et al. | |
| 2011/0146244 | A1 | 6/2011 | Farman et al. | |
| 2015/0033736 | A1 | 2/2015 | Kalebjian et al. | |
| 2021/0262403 | A1 * | 8/2021 | Andersson .......... | F02D 41/0052 |

* cited by examiner

METHOD FOR STARTING A POWER SYSTEM

CROSS REFERENCE TO RELATED APPLICATIONS

This application claims priority to European Patent Application No. 24160887.6, filed on Mar. 1, 2024, the disclosure and content of which is incorporated by reference herein in its entirety.

TECHNICAL FIELD

The disclosure relates generally to power systems. In particular aspects, the disclosure relates to a method for starting a power system. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

For a power system comprising an internal combustion engine, it may be desired to control the exhaust gases leaving the power system. For instance, it may be desired to control the exhaust gases such that an exhaust aftertreatment system connected to, or forming part of, the power system operates under desired conditions.

SUMMARY

According to a first aspect of the disclosure, there is provided a computer system comprising processing circuitry configured to issue information to start a power system. The power system comprises an internal combustion engine and a turbo which in turn comprises an inlet air compressor and an exhaust gas turbine. The exhaust gas turbine comprises a turbine wheel. The power system comprises an exhaust gas conduit assembly comprising at least one exhaust gas conduit wherein the exhaust gas turbine is adapted to receive exhaust gases from the internal combustion engine via the exhaust gas conduit assembly. The power system comprises an inlet air conduit assembly comprising at least one inlet air conduit wherein the internal combustion engine is adapted to receive inlet air from the inlet air compressor via the inlet air conduit assembly.

The power system further comprises a throttle arrangement arranged between the internal combustion engine and the turbine wheel. As seen in a direction of flow from the internal combustion engine to the turbine wheel, the throttle arrangement is adapted to assume a plurality of different conditions for throttling exhaust gas from the internal combustion engine to the turbine wheel. The plurality of different conditions comprises an open condition with a smallest throttling of the exhaust gas amongst the conditions as well as an at least partially closed condition associated with a throttling being larger than the smallest throttling.

The power system further comprises a first exhaust gas recirculation path connecting a portion of the exhaust gas conduit assembly located upstream the throttle arrangement, as seen in a direction of flow from the internal combustion engine to the turbine wheel, to a portion of the inlet air conduit assembly located downstream the inlet air compressor, as seen in a direction of flow from the inlet air compressor to the internal combustion engine. The power system further comprises a first exhaust gas recirculation path valve adapted to control at least a flow through the first exhaust gas recirculation path.

The computer system is configured to:

receive temperature information indicative of a temperature of air ambient of the power system, and in response to determining that the temperature information indicates a temperature of air ambient of the power system being equal to or below a threshold temperature, issue information to the power system to initiate a cold starting procedure comprising the following:

controlling the throttle arrangement such that an exhaust gas counterpressure upstream the throttle arrangement is within a target exhaust gas counterpressure range, and controlling the first exhaust gas recirculation path valve such that an amount of nitrogen oxides in exhaust gases emitted from the internal combustion engine is within a target nitrogen oxides amount range.

The first aspect of the disclosure may seek to enable that the power system can be started in an appropriate manner, such as under operating conditions in which emissions from the power system, or from systems connectable to the power system, may be kept appropriately low. A technical benefit may include that the above-mentioned control of the throttle arrangement implies that an appropriately high load is imposed on the internal combustion engine which may result in an appropriately high exhaust gas temperature but also an appropriately high mass flow. Such conditions may be suitable for e.g. an exhaust gas after-treatment system that may be adapted to receive exhaust gases from the turbine. Moreover, the above-mentioned control of the first exhaust gas recirculation path valve may imply that the amount of nitrogen oxides may be kept appropriately low. As a non-limiting example, the threshold temperature may be within the range of −15° to −5° C., e.g., within the range of −12° to −8° C.

Purely by way of example, the feature of controlling the throttle arrangement such that an exhaust gas counterpressure upstream the throttle arrangement is within a target exhaust gas counterpressure range comprises controlling the throttle arrangement using a closed loop control.

Purely by way of example, the feature of controlling the first exhaust gas recirculation path valve such that an amount of nitrogen oxides in exhaust gases emitted from the internal combustion engine is within a target nitrogen oxides amount range comprises controlling the first exhaust gas recirculation path valve using a closed loop control.

Purely by way of example, the internal combustion engine may comprise a plurality of cylinders. Moreover, the power system, for instance the internal combustion engine, may comprise a fuel supply system adapted to supply fuel to each cylinder of the internal combustion engine. As a non-limiting example, the cold starting procedure may comprise operating the fuel supply system so as to supply fuel to each cylinder of the internal combustion engine, for instance such that a ratio between a smallest fuel volume, being the fuel volume fed to the cylinder of the cylinders of the internal combustion engine receiving the smallest amount of fuel during a stroke sequence, and a largest fuel volume, being the fuel volume fed to the cylinder of the cylinders of the internal combustion engine receiving the largest amount of fuel during the stroke sequence, is at least 90%, optionally at least 95%, alternatively at least 99%. As such, in the non-limiting example presented above, approximately the same amount of fuel is fed to each cylinder of the internal combustion engine during the cold starting procedure.

Purely by way of example, the internal combustion engine may be a four-stroke engine.

According to a second aspect of the disclosure, there is provided a method for starting a power system. The power system comprises an internal combustion engine and a turbo which in turn comprises an inlet air compressor and an exhaust gas turbine. The exhaust gas turbine comprises a turbine wheel. The power system comprises an exhaust gas conduit assembly comprising at least one exhaust gas conduit wherein the exhaust gas turbine is adapted to receive exhaust gases from the internal combustion engine via the exhaust gas conduit assembly. The power system comprises an inlet air conduit assembly comprising at least one inlet air conduit wherein the internal combustion engine is adapted to receive inlet air from the inlet air compressor via the inlet air conduit assembly.

The power system further comprises a throttle arrangement arranged between the internal combustion engine and the turbine wheel, as seen in a direction of flow from the internal combustion engine to the turbine wheel. The throttle arrangement is adapted to assume a plurality of different conditions for throttling exhaust gas from the internal combustion engine to the turbine wheel. The plurality of different conditions comprises an open condition with a smallest throttling of the exhaust gas amongst the conditions as well as an at least partially closed condition associated with a throttling being larger than the smallest throttling.

The power system further comprises a first exhaust gas recirculation path connecting a portion of the exhaust gas conduit assembly located upstream the throttle arrangement, as seen in a direction of flow from the internal combustion engine to the turbine wheel, to a portion of the inlet air conduit assembly located downstream the inlet air compressor, as seen in a direction of flow from the inlet air compressor to the internal combustion engine. The power system further comprises a first exhaust gas recirculation path valve adapted to control at least a flow through the first exhaust gas recirculation path.

The method comprises:

- detecting temperature information indicative of a temperature of air ambient of the power system, and
- in response to determining that the temperature information indicates a temperature of air ambient of the power system being equal to or below a threshold temperature, initiating a cold starting procedure comprising the following:
  - controlling the throttle arrangement such that an exhaust gas counterpressure upstream the throttle arrangement is within a target exhaust gas counterpressure range, and
  - controlling the first exhaust gas recirculation path valve such that an amount of nitrogen oxides in exhaust gases emitted from the internal combustion engine is within a target nitrogen oxides amount range.

The second aspect of the disclosure may seek to enable that the power system can be started in an appropriate manner, such as under operating conditions in which emissions from the power system, or from systems connectable to the power system, may be kept appropriately low. A technical benefit may include that the above-mentioned control of the throttle arrangement implies that an appropriately high load is imposed on the internal combustion engine which may result in an appropriately high exhaust gas temperature but also an appropriately high mass flow. Such conditions may be suitable for e.g. a exhaust gas aftertreatment system that may be adapted to receive exhaust gases from the turbine. Moreover, the above-mentioned control of the first exhaust gas recirculation path valve may imply that the amount of nitrogen oxides may be kept appropriately low.

Purely by way of example, the feature of controlling the throttle arrangement such that an exhaust gas counterpressure upstream the throttle arrangement is within a target exhaust gas counterpressure range comprises controlling the throttle arrangement using a closed loop control.

Purely by way of example, the feature of controlling the first exhaust gas recirculation path valve such that an amount of nitrogen oxides in exhaust gases emitted from the internal combustion engine is within a target nitrogen oxides amount range comprises controlling the first exhaust gas recirculation path valve using a closed loop control.

Purely by way of example, the internal combustion engine may comprise a plurality of cylinders. Moreover, the power system, for instance the internal combustion engine, comprises a fuel supply system adapted to supply fuel to each cylinder of the internal combustion engine. As a non-limiting example, the cold starting procedure may comprise operating the fuel supply system so as to supply fuel to each cylinder of the internal combustion engine, for instance such that a ratio between a smallest fuel volume, being the fuel volume fed to the cylinder of the cylinders of the internal combustion engine receiving the smallest amount of fuel during a stroke sequence, and a largest fuel volume, being the fuel volume fed to the cylinder of the cylinders of the internal combustion engine receiving the largest amount of fuel during the stroke sequence, is at least 90%, optionally at least 95%, alternatively at least 99%. As such, in the non-limiting example presented above, approximately the same amount of fuel is fed to each cylinder of the internal combustion engine during the cold starting procedure.

Purely by way of example, the internal combustion engine may be a four-stroke engine.

Optionally, in some examples, the cold starting procedure commences by controlling the power system so as to assume a cold starting initial condition comprising that:

- the throttle arrangement assumes the open condition, and
- the first exhaust gas recirculation path valve is fully closed.

A technical benefit associated with commencing the starting procedure as presented above may include least one of the following: a cranking time of the internal combustion engine may be kept appropriately low, a combustion stability on the internal combustion engine may be appropriately high, and an amount of cold start smoke may be kept appropriately low.

Optionally, in some examples, the cold starting procedure comprises starting the internal combustion engine and maintaining the cold starting initial condition a predetermined delay time after starting the internal combustion engine. A technical benefit may include that the internal combustion engine may be allowed to be started in an appropriate manner before e.g. starting to controlling the throttle arrangement or the first exhaust gas recirculation path valve. As a non-limiting example, the predetermined delay time may be in the range of 0.1-5 seconds, for example in the range of 2-4 seconds.

Optionally, in some examples, the power system further comprises a second exhaust gas recirculation path connecting a portion of the exhaust gas conduit assembly located upstream the throttle arrangement, as seen in a direction of flow from the internal combustion engine to the turbine wheel, to a portion of the inlet air conduit assembly located downstream the inlet air compressor, as seen in a direction of flow from the inlet air compressor to the internal combustion engine. The first exhaust gas recirculation path is associated with a first cooling capacity for cooling gas flowing through the first exhaust gas recirculation path. The second exhaust gas recirculation path is associated with a second cooling capacity for cooling gas flowing through the second exhaust gas recirculation path. The second cooling capacity is lower than the first cooling capacity. The power system further comprises a second exhaust gas recirculation path valve adapted to control at least the flow through the second exhaust gas recirculation path. The cold starting procedure further comprises the following:

- controlling the second exhaust gas recirculation path valve such that an inlet gas temperature in the inlet air conduit assembly is within a target inlet gas temperature range.

A technical benefit may include that an inlet gas temperature may be kept within an appropriate range which in turn may imply an appropriate operation of the power system.

Purely by way of example, the feature of controlling the second exhaust gas recirculation path valve such that an inlet gas temperature in the inlet air conduit assembly is within a target inlet gas temperature range comprises controlling the second exhaust gas recirculation path valve using a closed loop control.

Optionally, in some examples, the cold starting initial condition further comprises that:

- the second exhaust gas recirculation path valve is fully closed.

A technical benefit associated with commencing the starting procedure as presented above may enhance any one of the benefits presented in [21] above, viz enhance at least one of the following: a cranking time of the internal combustion engine may be kept appropriately low, a combustion stability on the internal combustion engine may be appropriately high, and an amount of cold start smoke may be kept appropriately low.

Optionally, in some examples, the method comprises, in response to determining that the temperature information indicates a temperature of air ambient of the power system within an ambient temperature range, wherein each temperature in the ambient temperature range is above the threshold temperature, initiating an intermediate temperature starting procedure comprising the following:

- controlling the throttle arrangement so as to assume the open condition;
- controlling the second exhaust gas recirculation path valve such that an inlet gas temperature in the inlet air conduit assembly is equal to or above an inlet gas temperature threshold value, and
- controlling the first exhaust gas recirculation path valve such that an amount of nitrogen oxides in exhaust gases at a position downstream the internal combustion engine is equal to or below a nitrogen oxides amount threshold value.

A technical benefit may include that the starting procedure may be carried out with an appropriately low fuel consumption since the throttle arrangement assumes the open condition. Here, it should be noted that when the temperature of air ambient of the power system is within the ambient temperature range, there may be no need for closing the throttle arrangement since e.g. the exhaust gas temperature may be appropriately high nevertheless.

Optionally, in some examples, the intermediate temperature starting procedure commences by controlling the power system so as to assume an intermediate temperature starting initial condition in which:

- the first exhaust gas recirculation path valve is fully closed, and
- the second exhaust gas recirculation path valve is fully closed.

A technical benefit associated with commencing the intermediate temperature starting procedure as presented above may include least one of the following: a cranking time of the internal combustion engine may be kept appropriately low, a combustion stability on the internal combustion engine may be appropriately high, and an amount of cold start smoke may be kept appropriately low.

Optionally, in some examples, the intermediate temperature starting procedure comprises starting the internal combustion engine and maintaining the intermediate temperature starting initial condition a predetermined delay time after starting the internal combustion engine. A technical benefit may include that the internal combustion engine may be allowed to be started in an appropriate manner before e.g. starting to controlling the throttle arrangement or the first exhaust gas recirculation path valve. As a non-limiting example, the predetermined delay time may be in the range of 0.1-5 seconds, for example in the range of 2-4 seconds.

Optionally, in some examples, the method comprises determining the target inlet gas temperature range such that each temperature in the target inlet gas temperature range is equal to or above a dew point in a portion of the inlet air conduit assembly. A technical benefit may include that the condensation forming in the inlet manifold may at least be reduced which implies a reduced risk for corrosion damages on portions of the internal combustion engine, for instance inlet valves and injector nozzle tips. Purely by way of example, the "dew point in a portion of the inlet air conduit assembly" may relate to the temperature to which intake air in the portion of the inlet air conduit assembly must be cooled to become saturated with water vapor.

Optionally, in some examples, the dew point is determined on the basis of one or more of the following parameters: a mass flow of air through the inlet air conduit assembly; a mass flow of exhaust gas through the first exhaust gas recirculation path; a mass flow of exhaust gas through the second exhaust gas recirculation path; the inlet temperature in the inlet air conduit assembly, and an inlet pressure in the inlet air conduit assembly. A technical benefit may include that the dew point may be determined in an appropriate manner.

Optionally, in some examples, the target exhaust gas counterpressure range is determined on the basis of one or more of the following parameters: an engine speed of the internal combustion engine, a load of the internal combustion engine, the temperature information, an exhaust temperature of exhaust gases emitted from the internal combustion engine; a coolant temperature of a coolant adapted to cool the internal combustion engine, and an aftertreatment temperature of a portion, e.g., a metal portion, of an exhaust gas aftertreatment system adapted to receive exhaust gases from the exhaust gas turbine. A technical benefit may include that the target exhaust gas counterpressure range may be determined in an appropriate manner.

Optionally, in some examples, the target nitrogen oxides amount range is determined on the basis of one or more of the following parameters: an engine speed of the internal combustion engine, a load of the internal combustion engine, the temperature information, an exhaust temperature of exhaust gases emitted from the internal combustion engine; a coolant temperature of a coolant adapted to cool the internal combustion engine, and an aftertreatment temperature of a portion, e.g., a metal portion, of an exhaust gas aftertreatment system adapted to receive exhaust gases from the exhaust gas turbine. A technical benefit may include that the target nitrogen oxides amount range may be determined in an appropriate manner.

Optionally, in some examples, the method comprises determining the amount of nitrogen oxides in exhaust gases emitted from the internal combustion engine by determining an amount of nitrogen oxides in exhaust gases in a portion of the exhaust gas conduit assembly.

Optionally, in some examples, the exhaust gas turbine comprises an exhaust gas turbine housing enclosing the turbine wheel, the throttle arrangement comprises a pre-turbine throttle arranged between the internal combustion engine and the exhaust gas turbine housing, as seen in a direction of flow from the internal combustion engine to the turbine wheel. A technical benefit may include that the exhaust gas counterpressure upstream the throttle arrangement may be controlled in such a manner that it may be possible to ensure a sufficient expansion ratio across the turbine and/or maintain at least one of the following: turbo speed, boost pressure and air mass flow through the internal combustion engine.

According to a third aspect of the disclosure, there is provided a computer program product comprising program code for performing, when executed by processing circuitry of a computer system, the method of the second aspect of the disclosure.

According to a fourth aspect of the disclosure, there is provided a non-transitory computer-readable storage medium comprising instructions, which when executed by processing circuitry of a computer system, cause the processing circuitry to perform the method of the second aspect of the disclosure.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

For a power system comprising an internal combustion engine, it may be desired to control the exhaust gases leaving the power system. For instance, it may be desired to control the exhaust gases such that an exhaust aftertreatment system connected to, or forming part of, the power system operates under desired conditions.

The disclosure may seek to control the exhaust gas in an appropriate manner. For instance, the temperature of the exhaust gas may be controlled. A technical benefit may include an increased versatility in the control of exhaust gas characteristics.

Figure 1:
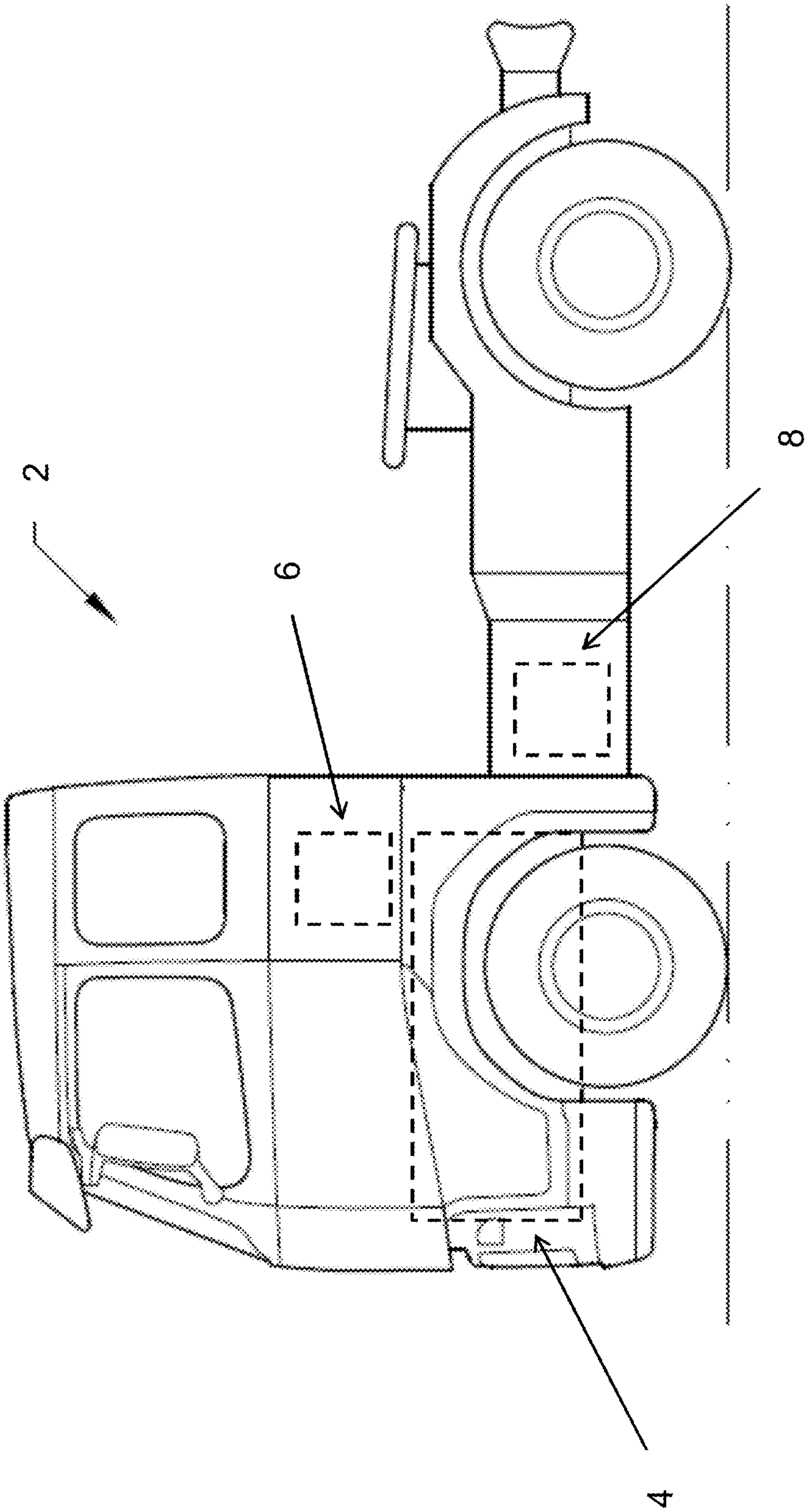
FIG. 1 is a side view of an exemplary vehicle.

FIG. 1 is an exemplary embodiment of the present disclosure, comprising a side view of a vehicle 2, in the form of a truck, according to an example.

Whilst the shown embodiment illustrates a truck, the disclosure may relate to any vehicle, such as a car, bus, industrial vehicle, boat, ship, etc., wherein motive power may be derived from an internal combustion engine.

The vehicle 2 comprises a power system 4. Moreover, the vehicle 2 may also comprise a computer system 6.

While the computer system 6 is illustrated as a single device, i.e. a single box in FIG. 1 (or any one of FIG. 2 and FIG. 5 which will be presented below), the computer system 6 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The vehicle 2 may further comprise an exhaust aftertreatment system 8. As a non-limiting example, the exhaust aftertreatment system 8 may comprise a catalyst (not shown) and/or a particle filter (not shown). Purely by way of example, the exhaust after-treatment system 8 may form part of the power system 4 and this applies to any example of the power system 4 of the present disclosure. Performance of exhaust after-treatment systems may be dependent on temperature, e.g. the temperature of exhaust gas passing therethrough. As such, the disclosure may be aimed at controlling the power system 4 such that a sufficiently high exhaust aftertreatment system temperature may be achieved. Achieving the necessary temperature may for instance be necessary when starting the power system 4.

Figure 2:
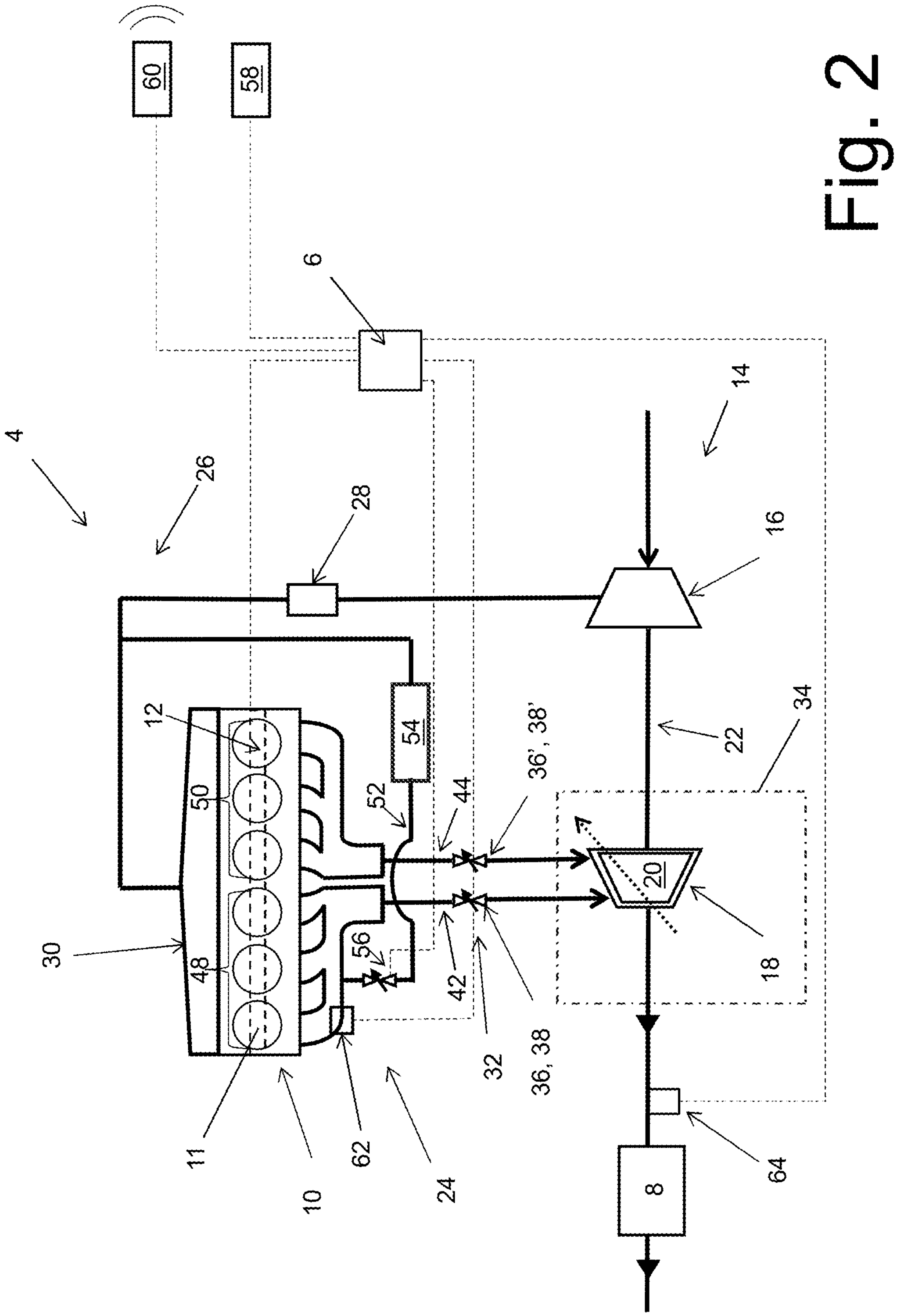
FIG. 2 is a schematic view of an exemplary power system.

FIG. 2 shows an example of a power system 4. Purely by way of example, the FIG. 2 power system 4 may be used in the vehicle 2 illustrated in FIG. 1.

As indicated in FIG. 2, the power system 4 comprises an internal combustion engine 10. The internal combustion engine 10 may comprise a cylinder 12. In the example illustrated in FIG. 2, the internal combustion engine 10 comprises six cylinders 12. However, the combustion engine 10 may comprise any number of cylinders 12, for example the internal combustion engine 10 may comprise four, six, or eight cylinders 12. As a non-limiting example, the internal combustion engine 10 may be a diesel engine and this may apply for any example of the power system 4.

Purely by way of example, the internal combustion engine 10 may be a four-stroke engine. Irrespective of the type of engine, the power system 4, for instance the internal combustion engine 10, may comprise a fuel supply system 11 adapted to supply fuel to each cylinder 12 of the internal combustion engine 10. By way of example, only, the fuel supply system 11 may comprise a fuel rail and one or more fuel injectors per cylinder 12.

Moreover, the power system 4 comprises a turbo 14 which in turn comprises an inlet air compressor 16 and an exhaust gas turbine 18. The exhaust gas turbine 18 comprises a turbine wheel 20. Moreover, though purely by way of example, the inlet air compressor 16 may be rotationally connected to the turbine wheel 20 via a shaft 22.

As indicated in FIG. 2, the power system 4 comprises an exhaust gas conduit assembly 24 comprising at least one exhaust gas conduit wherein the exhaust gas turbine 18 is adapted to receive exhaust gases from the internal combustion engine 10 via the exhaust gas conduit assembly 24. Further, the power system 4 comprises an inlet air conduit assembly 26 comprising at least one inlet air conduit wherein the internal combustion engine 10 is adapted to receive inlet air from the inlet air compressor 16 via the inlet air conduit assembly 26. Purely by way of example, as indicated in FIG. 2, the inlet air conduit assembly 26 may comprise a charge air cooler 28 located between the inlet air compressor 16 and the internal combustion engine 10, as seen in a direction of flow from the inlet air compressor 16 to the internal combustion engine 10. Moreover, again purely by way of example, the inlet air conduit assembly 26 may comprise an intake manifold 30 adapted to distribute intake air to the cylinders 12.

The power system 4 further comprises a throttle arrangement 32 arranged between the internal combustion engine 10 and the turbine wheel 20, as seen in a direction of flow from the internal combustion engine 10 to the turbine wheel 20. The throttle arrangement 32 is adapted to assume a plurality of different conditions for throttling exhaust gas from the internal combustion engine 10 to the turbine wheel 20. The plurality of different conditions comprises an open condition with a smallest throttling of the exhaust gas amongst the conditions as well as an at least partially closed condition associated with a throttling being larger than the smallest throttling.

In the FIG. 2 example, the exhaust gas turbine 18 comprises an exhaust gas turbine housing 34 (as schematically indicated by the dashed and dotted box in FIG. 2) enclosing the turbine wheel 20. Purely by way of example, the turbo 14 may also comprise an inlet air compressor housing (not shown) at least partially enclosing the inlet air compressor 16. As a non-limiting example, the exhaust gas turbine housing 34 and the inlet air compressor housing (not shown) may be connected to each other and may in some examples form a unitary component. Moreover, in the FIG. 2 example, the throttle arrangement 32 comprises a pre-turbine throttle 36 arranged between the internal combustion engine 10 and the exhaust gas turbine housing 34, as seen in a direction of flow from the internal combustion engine 10 to the turbine wheel 20. A technical benefit may include that the exhaust gas counterpressure upstream the throttle arrangement 32 may be controlled in such a manner that it may be possible to ensure a sufficient expansion ratio across the turbine 18 and/or maintain at least one of the following: turbo speed (e.g. rotational speed of the shaft 22), boost pressure (i.e. a pressure downstream the inlet air compressor 16) and air mass flow through the internal combustion engine 10.

Purely by way of example, the pre-turbine throttle 36 may comprise a pivotable flap 38, e.g., a continuously pivotable flap, pivotable between the open condition and an end condition. In some examples, the end condition results in that the portion of the exhaust gas conduit assembly 24 is fully closed.

As a non-limiting example, and as indicated in FIG. 2, the exhaust gas conduit assembly 24 may comprise a first exhaust gas conduit assembly portion 42 and a second exhaust gas conduit assembly portion 44. Purely by way of example, the exhaust gas turbine 18 may be adapted to receive exhaust gases from a first bank 48 of cylinders 12 of the internal combustion engine 10 via the first exhaust gas conduit assembly portion 42. Moreover, again by way of example, the exhaust gas turbine 18 may be adapted to receive exhaust gases from a second bank 50 of cylinders 12 of the internal combustion engine 10 via the second exhaust gas conduit assembly portion 44.

Again by way of example only, the throttle arrangement 32 may comprise a first pre-turbine throttle 36 arranged in the first exhaust gas conduit assembly portion 42 between the internal combustion engine 10 and the exhaust gas turbine housing 34, as seen in a direction of flow from the internal combustion engine 10 to the turbine wheel 20. Moreover, the throttle arrangement 32 may comprise a second pre-turbine throttle 36' arranged in the second exhaust gas conduit assembly portion 44 between the internal combustion engine 10 and the exhaust gas turbine housing 34, as seen in a direction of flow from the internal combustion engine 10 to the turbine wheel 20. Each one of the of the first and second pre-turbine throttles 36, 36' may comprise a pivotable flap 38, 38', e.g., a continuously pivotable flap, pivotable between the open condition and an end condition, e.g., the end condition may result in that the portion of the exhaust gas conduit assembly 24 is fully closed.

Purely by way of example only, pivotable flaps 38, 38' may be adapted to move in unison. As a non-limiting example, the pivotable flaps 38, 38' may be rotationally connected to each other and may for instance be rotated by the same actuator.

It should be noted that the throttle arrangement 32 may comprise throttling elements instead of, or in addition to, the pre-turbine throttle 36, such as any one of the examples of the pre-turbine throttle 36 presented above. To this end, as schematically indicated by the dotted arrow line in FIG. 2, the turbo 14 may comprise a variable geometry turbine 18 in fluid communication with the internal combustion engine 10. As a non-limiting example, the variable geometry turbine 18 may comprise a plurality of guide vanes (not shown) controlling the flow of exhaust gases fed to the turbine wheel 20.

Furthermore, as also indicated in FIG. 2, the power system 4 further comprises a first exhaust gas recirculation path 52 connecting a portion of the exhaust gas conduit assembly 24 located upstream the throttle arrangement 32, as seen in a direction of flow from the internal combustion engine 10 to the turbine wheel 20, to a portion of the inlet air conduit assembly 26 located downstream the inlet air compressor 16, as seen in a direction of flow from the inlet air compressor 16 to the internal combustion engine 10.

As a non-limiting example, the first exhaust gas recirculation path 52 may comprise an exhaust gas recirculation cooler 54 adapted to cool exhaust gas fed through the first exhaust gas recirculation path 52. Additionally, the power system 4 further comprises a first exhaust gas recirculation path valve 56 adapted to control at least a flow through the first exhaust gas recirculation path 52. As such, when the first exhaust gas recirculation path valve 56 is at least partially open, the combustion engine 10 will receive a mixture of recirculated exhaust gas fed via the first exhaust gas recirculation path 52 and inlet air from the inlet air compressor 16.

Features of the computer system 6 will be presented hereinbelow. It should be noted that the below presentation of the computer system 6 is equally applicable to the method according to the second aspect of the present disclosure.

According to the present disclosure, the computer system 6 is configured to receive temperature information TI indicative of a temperature $T_{amb}$ of air ambient of the power system 4. To this end, though purely by way of example, the computer system 6 may be adapted to receive the temperature information TI from a temperature sensor 58 adapted to detect an air temperature of air ambient of the power system 4. In examples in which the power system 4 is adapted to power a vehicle 2, see e.g. the FIG. 1 example, the temperature sensor 58 may be adapted to detect an air temperature of air ambient of the vehicle 2. By way of example only, the temperature sensor 58 may be implemented as a thermometer.

Instead of, or in addition to, the temperature sensor 58 exemplified above, the computer system 6 may be configured to receive weather information from a weather station (not shown), a weather service (not shown) or the like. Purely by way of example, the computer system 6 may be adapted to receive information via a receiver 60 which may be in wireless communication with the above-mentioned weather station (not shown), or weather service (not shown).

Irrespectively of how the computer system 6 is configured to receive temperature information TI indicative of a temperature of air ambient of the power system 4, the computer system 6 is configured to: in response to determining that the temperature information TI indicates a temperature $T_{amb}$ ambient of the power system 4 being equal to or below a threshold temperature $T_{thres}$, issue information to the power system 4 to initiate a cold starting procedure comprising the following:

- controlling the throttle arrangement 32 such that an exhaust gas counterpressure upstream the throttle arrangement 32 is within a target exhaust gas counterpressure range $\Delta P_{exhaust}$, and
- controlling the first exhaust gas recirculation path valve 56 such that an amount of nitrogen oxides in exhaust gases emitted from the internal combustion engine is within a target nitrogen oxides amount range $\Delta NO_{x,\ target}$.

To this end, though purely by way of example, as indicated in FIG. 2 example, the computer system 6 may be adapted to receive information indicative of a pressure in a portion of the exhaust gas conduit assembly 24. As a non-limiting example, the computer system 6 may be adapted to receive information from a pressure sensor 62 connected to a portion of the exhaust gas conduit assembly 24 located upstream of the throttle arrangement 32.

As a non-limiting example, the threshold temperature $T_{thres}$ may be within the range of −15° to −5° C., e.g., within the range of −12° to −8° C.

Moreover, though purely by way of example, as indicated in FIG. 2 example, the computer system 6 may be adapted to receive information indicative of the amount of nitrogen oxides in exhaust gases emitted from the internal combustion engine 10. By way of example only, the amount of nitrogen oxides in exhaust gases emitted from the internal combustion engine 10 may be determined by determining an amount of nitrogen oxides in exhaust gases in a portion of the exhaust gas conduit assembly 24. As a non-limiting example, the computer system 6 may be adapted to receive information from a nitrogen oxides sensor 64. In the FIG. 2 example, the power system 4 comprises an exhaust gas after-treatment system 8 (see also FIG. 1) adapted to receive exhaust gases emitted from the exhaust gas turbine 18. By way of example only, the exhaust gas after-treatment system 8 may comprise one or more of the following: a particle filter (not shown) and a selective catalytic reduction catalyst (not shown).

The nitrogen oxides sensor 64 may be located between the exhaust gas turbine 18 and the exhaust gas after-treatment system 8, as seen in a direction of flow from the exhaust gas turbine 18. Moreover, when the exhaust gas after treatment system 8 comprises a selective catalytic reduction catalyst (not shown), the nitrogen oxides sensor 64 may be located upstream the selective catalytic reduction catalyst. However, it is also envisaged that in other examples of the power system, the nitrogen oxides sensor 64 may be adapted to detect the amount of nitrogen oxides in exhaust gases in other portions of the power system 4, such as in a portion of the exhaust gas conduit assembly 24.

Moreover, as exemplified in FIG. 2, the computer system 6 may be adapted to issue control information to each one of the throttle arrangement 32 and the first exhaust gas recirculation path valve 56. As non-limiting examples, the computer system 6 may be adapted to issue control information to the throttle arrangement 32 such that the throttle arrangement 32 assumes a condition with a certain opening percentage. In a similar vein, the computer system 6 may be adapted to issue control information to the first exhaust gas recirculation path valve 56 such that the first exhaust gas recirculation path valve 56 assumes a condition with a certain opening percentage.

As a non-limiting example, the cold starting procedure may comprise operating the fuel supply system 11 so as to supply fuel to each cylinder 12 of the internal combustion engine 10. By way of example only, the cold starting procedure may comprise operating the fuel supply system 11 such that a ratio between a smallest fuel volume, being the fuel volume fed to the cylinder of the cylinders of the internal combustion engine receiving the smallest amount of fuel during a stroke sequence, and a largest fuel volume, being the fuel volume fed to the cylinder of the cylinders of the internal combustion engine receiving the largest amount of fuel during the stroke sequence, is at least 90%, optionally at least 95%, alternatively at least 99%. As such, in the non-limiting example presented above, approximately the same amount of fuel is fed to each cylinder 12 of the internal combustion engine 10 during the cold starting procedure.

Figure 3:
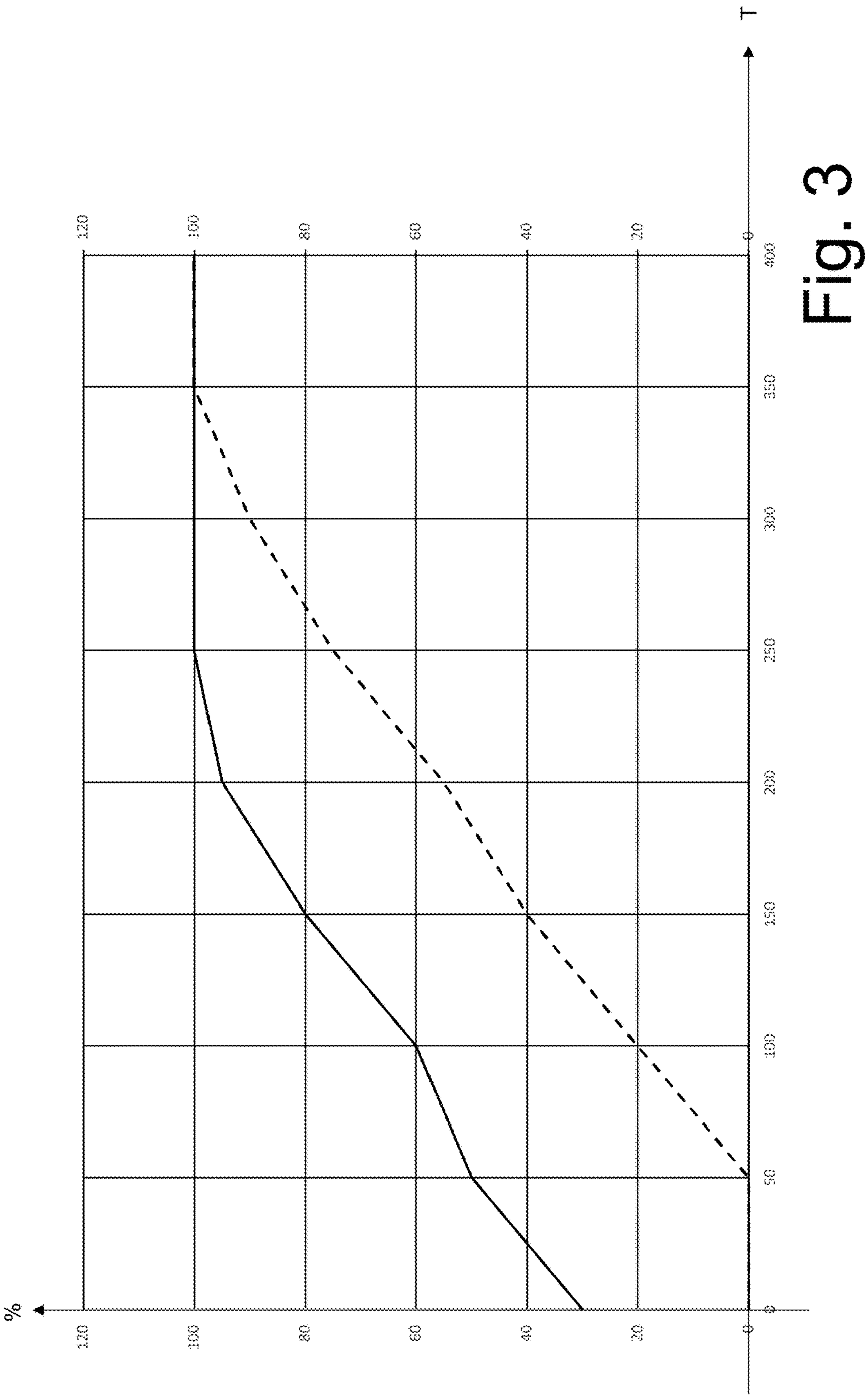
FIG. 3 is a graph illustrating an exemplary cold starting procedure.

A control procedure in accordance with the present disclosure is exemplified in FIG. 3. FIG. 3 illustrates a graph wherein the abscissa indicates time and the ordinate indicates an opening percentage of a the respective valve or valve assembly. To this end, the solid line in FIG. 3 indicates the opening percentage of the throttle arrangement 32 as a function of time and the dashed line indicates the opening percentage of the first exhaust gas recirculation path valve 56 as a function of time. The control of the throttle arrangement 32 and the first exhaust gas recirculation path valve 56 in the manner presented hereinabove, viz:

- controlling the throttle arrangement 32, for instance using a closed loop, such that an exhaust gas counterpressure upstream the throttle arrangement 32 is within a target exhaust gas counterpressure range $\Delta P_{exhaust}$, and controlling the first exhaust gas recirculation path valve 56, for instance using a closed loop, such that an amount of nitrogen oxides in exhaust gases emitted from the internal combustion engine is within a target nitrogen oxides amount range $\Delta NO_{x,\ target}$, may result in opening percentage function such as the ones exemplified in FIG. 3 in which the opening percentage of each one of the throttle arrangement 32 and the first exhaust gas recirculation path valve 56 increases as a function of time so as to eventually reach an opening percentage of 100.

As a non-limiting example, in examples in which the throttle arrangement 32 is controlled using a closed loop, information from the pressure sensor 62 may be used for determining an actual value of the exhaust gas counterpressure upstream the throttle arrangement 32.

As a non-limiting example, in examples in which the first exhaust gas recirculation path valve 56 is controlled using a closed loop, information from the nitrogen oxides sensor 64 may be used for determining an actual value of the amount of nitrogen oxides in exhaust gases emitted from the internal combustion engine.

In some examples, the cold starting procedure may commence by controlling the power system so as to assume a cold starting initial condition comprising that:

the throttle arrangement 32 assumes the open condition, and the first exhaust gas recirculation path valve 56 is fully closed.

Moreover, in some examples, the cold starting procedure may comprise starting the internal combustion engine 10 and maintaining the cold starting initial condition a predetermined delay time $\Delta t$ after starting the internal combustion engine. As a non-limiting example, the predetermined delay time may be in the range of 0.1-5 seconds, for example in the range of 2-4 seconds.

Figure 4:
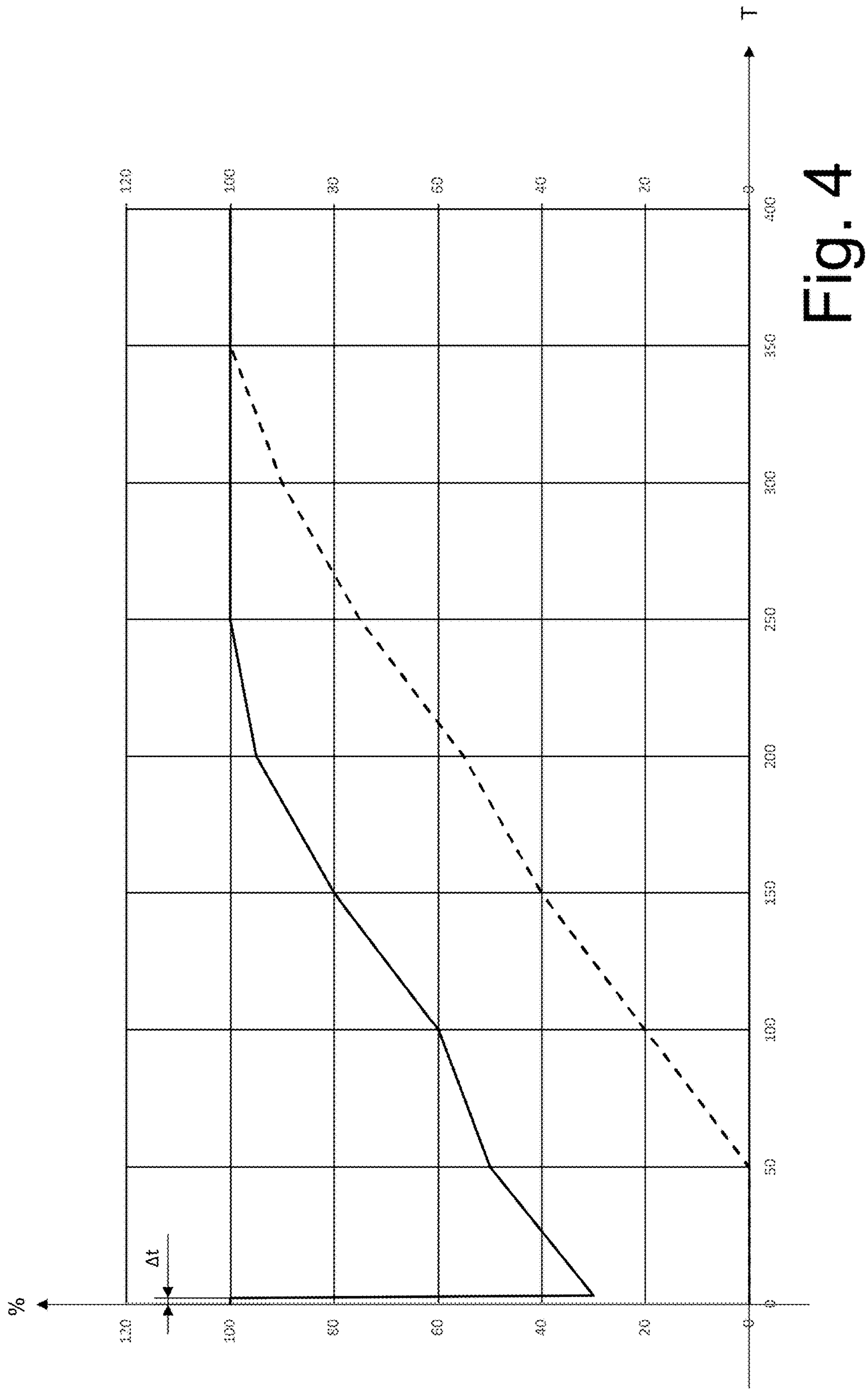
FIG. 4 is a graph illustrating another exemplary cold starting procedure.

FIG. 4 illustrates a graph in which the throttle arrangement 32 and the first exhaust gas recirculation path valve 56 are controlled with a cold starting procedure commencing by a cold starting initial condition and in which the cold starting initial condition is maintained for a predetermined delay time. In the FIG. 4 graph, 2 seconds is used as an example of the delay time $\Delta t$. As may be gleaned from FIG. 4, the opening percentage of the throttle arrangement 32 is 100 and the opening percentage of the first exhaust gas recirculation path valve 56 is 0 throughout the delay time $\Delta t$. Thereafter, the control of the throttle arrangement 32 and the first exhaust gas recirculation path valve 56 is carried out in the manner presented hereinabove, viz:

controlling the throttle arrangement 32 such that an exhaust gas counterpressure upstream the throttle arrangement 32 is within a target exhaust gas counterpressure range $\Delta P_{exhaust}$, and controlling the first exhaust gas recirculation path valve 56 such that an amount of nitrogen oxides in exhaust gases emitted from the internal combustion engine is within a target nitrogen oxides amount range $\Delta NO_{x,\ target}$.

Operating the power system 4 with a cold starting initial condition that is maintained for a delay time $\Delta t$ implies that the internal combustion engine may be allowed to be started in an appropriate manner before e.g. starting to controlling the throttle arrangement or the first exhaust gas recirculation path valve. Purely by way of example, the cold starting initial condition that is maintained for a delay time $\Delta t$ may imply at least one of the following: a cranking time of the internal combustion engine may be kept appropriately low, a combustion stability on the internal combustion engine may be appropriately high, and an amount of cold start smoke may be kept appropriately low.

Figure 5:
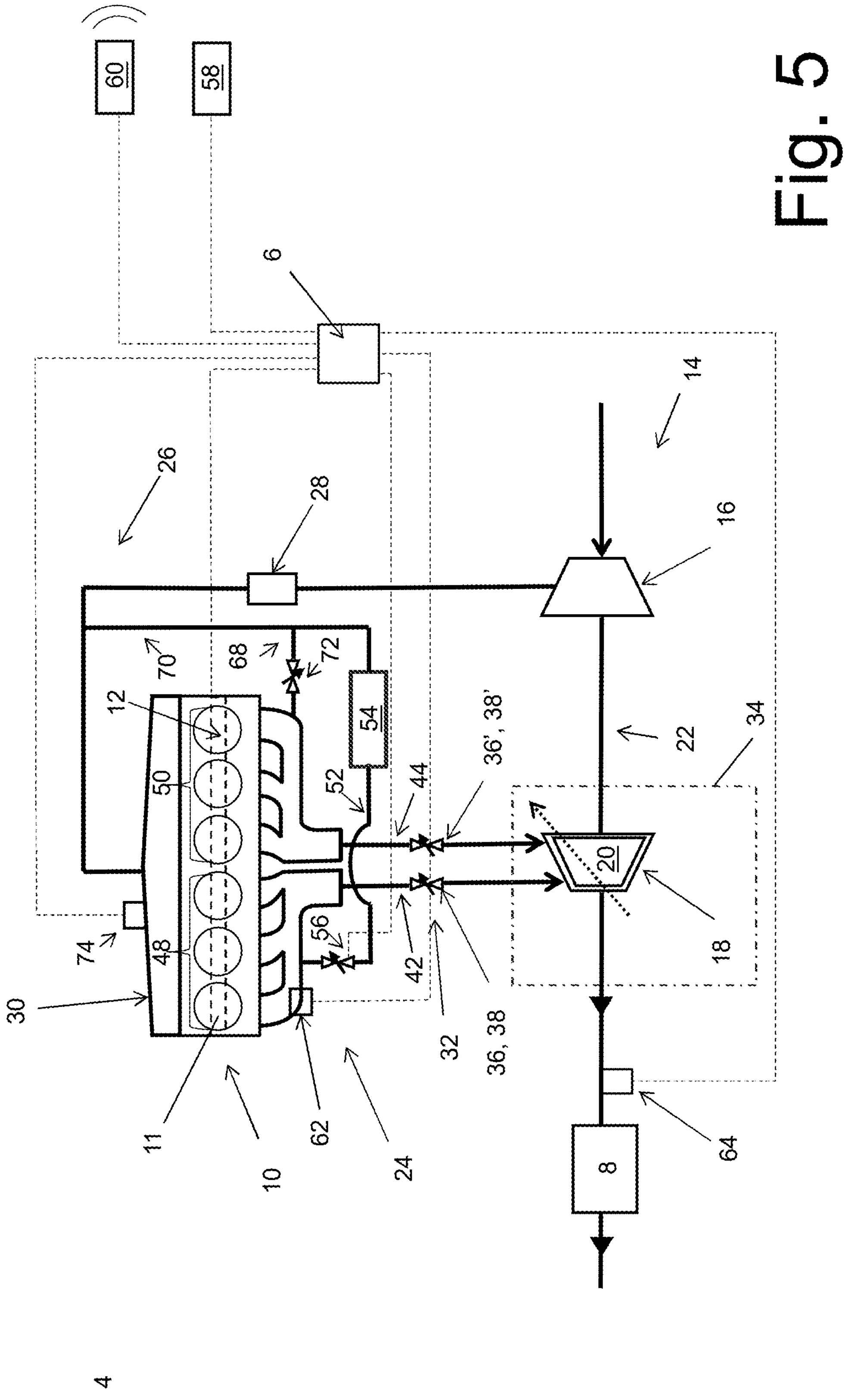
FIG. 5 is a schematic view of another exemplary power system.

FIG. 5 illustrates another example of the power system 4. In the FIG. 5 example, features similar to the FIG. 2 power system 4 are given the same reference numerals as in FIG. 2 although such features are not discussed in detail again for the sake of brevity. The FIG. 5 power system 4 further comprises a second exhaust gas recirculation path 68 connecting a portion of the exhaust gas conduit assembly 24 located upstream the throttle arrangement 32, as seen in a direction of flow from the internal combustion engine 10 to the turbine wheel 20, to a portion of the inlet air conduit assembly 26 located downstream the inlet air compressor 16, as seen in a direction of flow from the inlet air compressor 16 to the internal combustion engine 10. The first exhaust gas recirculation path 52 is associated with a first cooling capacity for cooling gas flowing through the first exhaust gas recirculation path 52 and the second exhaust gas recirculation path 68 is associated with a second cooling capacity for cooling gas flowing through the second exhaust gas recirculation path 68. The second cooling capacity is lower than the first cooling capacity.

The above differences in cooling capacities may be achieved in a plurality of different ways. Purely by way of example, and as indicated above, the first exhaust gas recirculation path 52 may comprise an exhaust gas recirculation cooler 54 adapted to cool exhaust gas fed through the first exhaust gas recirculation path 52. Moreover, the second exhaust gas recirculation path 68 may be devoid of any exhaust gas recirculation cooler or it may comprise a second exhaust gas recirculation cooler (not shown), the cooling capacity of which is lower than the cooling capacity of the exhaust gas recirculation cooler 54 of the first exhaust gas recirculation path 52. Moreover, by way of example only and as illustrated in the FIG. 5 example, the first exhaust gas recirculation path 52 and the second exhaust gas recirculation path 68 may share a common exhaust gas recirculation path portion 70 located downstream the exhaust gas recirculation cooler 54.

Furthermore, in the FIG. 5 example, the first exhaust gas recirculation path 52 is fluidly connected to the first exhaust gas conduit assembly portion 42 and the second exhaust gas recirculation path 68 is fluidly connected to the second exhaust gas conduit assembly portion 44. However, in other examples of the power system 4, both the first exhaust gas recirculation path 52 and the second exhaust gas recirculation path 68 may be connected to the same exhaust gas conduit assembly portion 42, 44. As such, in examples of the power system 4, both the first exhaust gas recirculation path 52 and the second exhaust gas recirculation path 68 may be connected to the first exhaust gas conduit assembly portion 42, alternatively, both the first exhaust gas recirculation path 52 and the second exhaust gas recirculation path 68 may be connected to the second exhaust gas conduit assembly portion 44.

Moreover, as indicated in FIG. 5, the power system 4 may further comprise a second exhaust gas recirculation path valve 72 adapted to control at least the flow through the second exhaust gas recirculation path 68. Moreover, the cold starting procedure may further comprise the following:

controlling the second exhaust gas recirculation path valve 72 such that an inlet gas temperature in the inlet air conduit assembly is within a target inlet gas temperature range $\Delta T_{inlet}$.

As such, when the second exhaust gas recirculation path valve 72 is at least partially open, the internal combustion engine 10 will receive a mixture of recirculated exhaust gas fed via the second exhaust gas recirculation path 68, inlet air from the inlet air compressor 16 and possibly also recirculated exhaust gas fed via the first exhaust gas recirculation path 52, assuming that the first exhaust gas recirculation path valve 56 is at least partially open.

An example of the power system 4 such as the one illustrated in FIG. 5, in which the first exhaust gas recirculation path 52 is fluidly connected to the first exhaust gas conduit assembly portion 42 and the second exhaust gas recirculation path 68 is fluidly connected to the second exhaust gas conduit assembly portion 44, may imply a relatively symmetrical flow in each one of the first and second exhaust gas conduit assembly portions 42, 44. As such, by way of example only, if each one of the first exhaust gas recirculation path valve 56 and the second exhaust gas recirculation path valve 72 assumes an open or at least partially open condition, the difference between e.g. the mass flow through the first and second exhaust gas conduit assembly portions 42, 44 may be relatively small which in turn may imply appropriate loads on the turbine wheel 20 during operation of the power system 4. Moreover, an example of the power system 4 such as the one illustrated in FIG. 5 may be associated with an appropriately low risk of e.g. thermo mechanical fatigue since e.g. load cycles may be distributed amongst the two exhaust gas conduit assembly portions 42, 44.

Purely by way of example, the computer system 6 may be adapted to receive information indicative of the inlet gas temperature in the inlet air conduit assembly 26. As a non-limiting example, and as illustrated in FIG. 5, the power system 4 may comprise an inlet air temperature sensor 74 connected to a portion of the inlet air conduit assembly 26. In the FIG. 5 example, the inlet air temperature sensor 74 is adapted to detect the temperature in the above-mentioned intake manifold 30. However, in other examples of the power system 4, the inlet air temperature sensor 74 may be adapted to detect the temperature in other portions of the inlet air conduit assembly 26, e.g., downstream of the charge air cooler 28.

Figure 6:
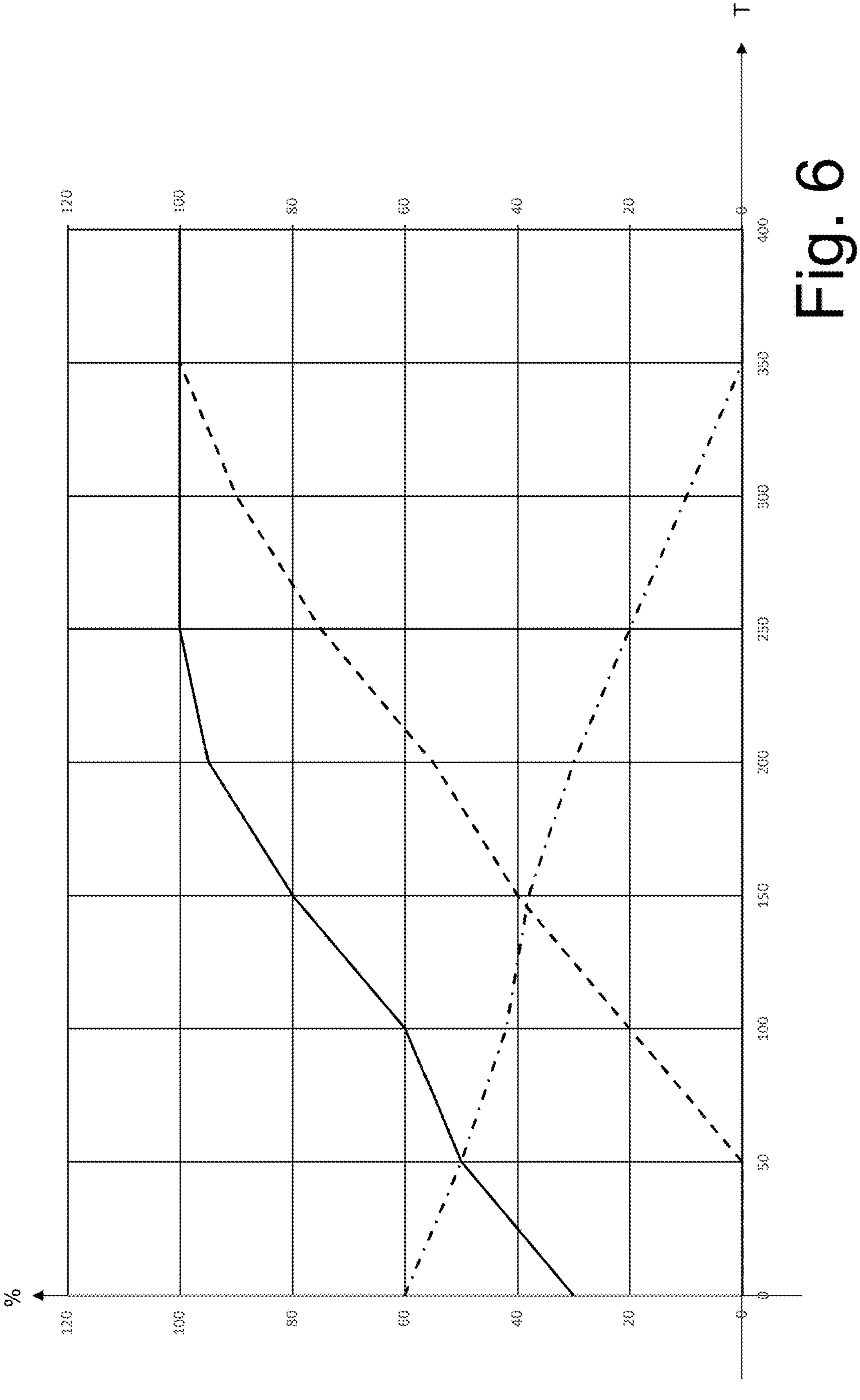
FIGS. 6-9 are graphs illustrating further exemplary cold starting procedures.

FIG. 6 illustrates a graph in which the throttle arrangement 32, the first exhaust gas recirculation path valve 56 and the second exhaust gas recirculation path valve 72 are controlled in accordance with the above. To this end, the solid line in FIG. 6 again indicates the opening percentage of the throttle arrangement 32 as a function of time, and the dashed line again indicates the opening percentage of the first exhaust gas recirculation path valve 56 as a function of time and the dashed and dotted line indicates the opening percentage of the second exhaust gas recirculation path valve 72 as a function of time.

By way of example only, the above-mentioned cold starting initial condition may further comprise that the second exhaust gas recirculation path valve 72 is fully closed.

Figure 7:
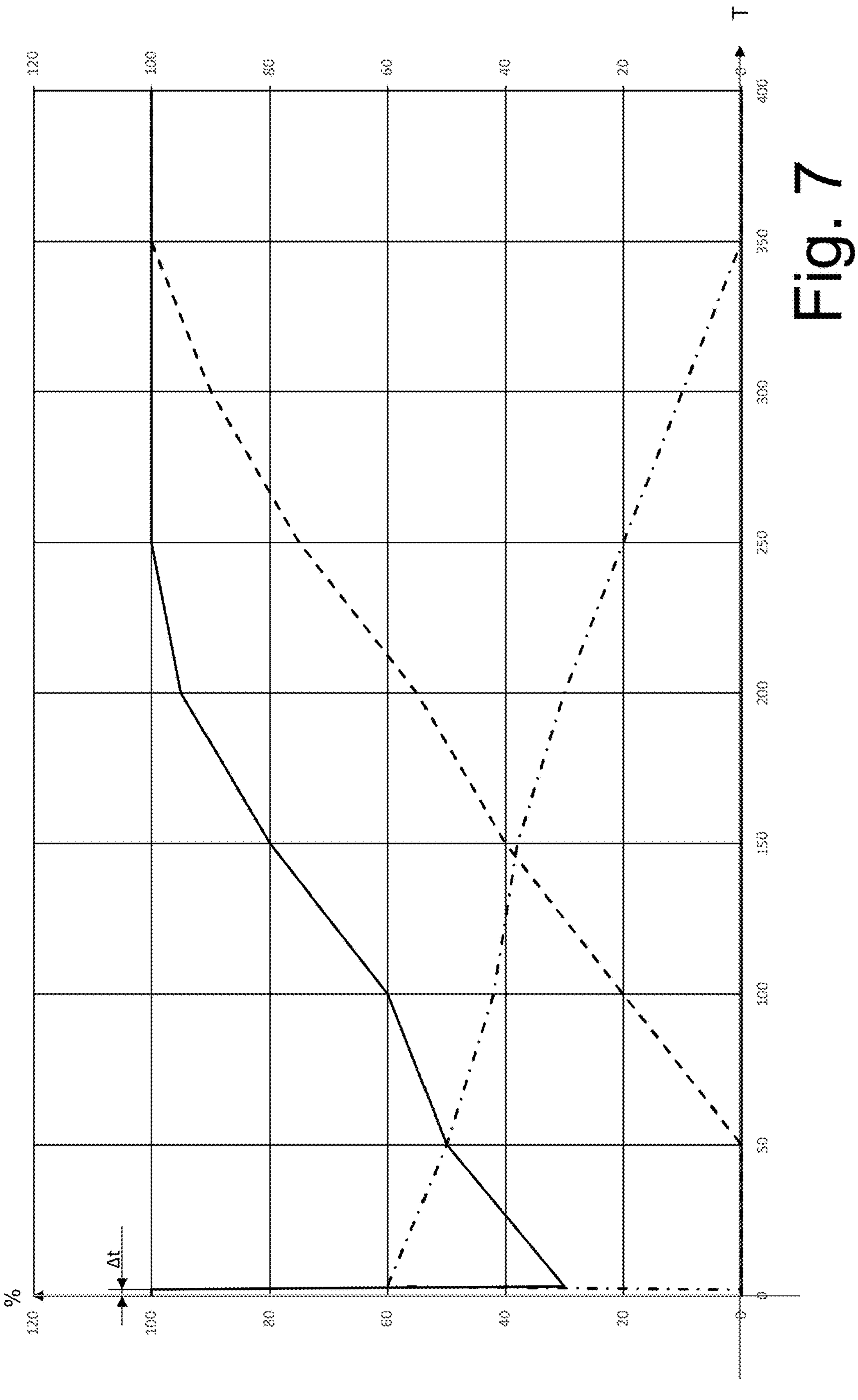

FIG. 7 illustrates a graph in which the throttle arrangement 32, the first exhaust gas recirculation path valve 56 and the second exhaust gas recirculation path valve 72 are controlled with a cold starting procedure commencing by a cold starting initial condition and in which the cold starting initial condition is maintained for a predetermined delay time. In the FIG. 7 graph, 2 seconds is used as an example of the delay time $\Delta t$. As may be gleaned from FIG. 7, the opening percentage of the throttle arrangement 32 is 100 and the opening percentage of each one of the first and second exhaust gas recirculation path valves 56, 72 is 0 during the delay time $\Delta t$. Thereafter, the control of the throttle arrangement 32 and the first exhaust gas recirculation path valve 56 is carried out in the manner presented hereinabove, viz:

- controlling the throttle arrangement 32 such that an exhaust gas counterpressure upstream the throttle arrangement 32 is within a target exhaust gas counterpressure range $\Delta P_{exhaust}$;
- controlling the first exhaust gas recirculation path valve 56 such that an amount of nitrogen oxides in exhaust gases emitted from the internal combustion engine is within a target nitrogen oxides amount range $\Delta NO_{x,\ target}$, and
- controlling the second exhaust gas recirculation path valve 74 such that an inlet gas temperature in the inlet air conduit assembly is within a target inlet gas temperature range $\Delta T_{inlet}$.

Operating the power system 4 with a cold starting initial condition that is maintained for a delay time $\Delta t$ implies that the internal combustion engine may be allowed to be started in an appropriate manner before e.g. starting to controlling the throttle arrangement or the first exhaust gas recirculation path valve. Purely by way of example, the cold starting initial condition that is maintained for a delay time $\Delta t$ may imply at least one of the following: a cranking time of the internal combustion engine may be kept appropriately low, a combustion stability on the internal combustion engine may be appropriately high, and an amount of cold start smoke may be kept appropriately low.

By way of example only, the method of the present disclosure may comprise and/or the computer system of the present disclosure may be configured to, in response to determining that the temperature information TI indicates a temperature of air ambient of the power system within an ambient temperature range $\Delta T$, wherein each temperature in the ambient temperature range is above the threshold temperature $T_{thres}$, initiate an intermediate temperature starting procedure comprising the following:

- controlling the throttle arrangement 32 so as to assume the open condition;
- controlling the second exhaust gas recirculation path valve 72 such that an inlet gas temperature in the inlet air conduit assembly is equal to or above an inlet gas temperature threshold value, and
- controlling the first exhaust gas recirculation path valve 56 such that an amount of nitrogen oxides in exhaust gases at a position downstream the internal combustion engine is equal to or below a nitrogen oxides amount threshold value.

Figure 8:
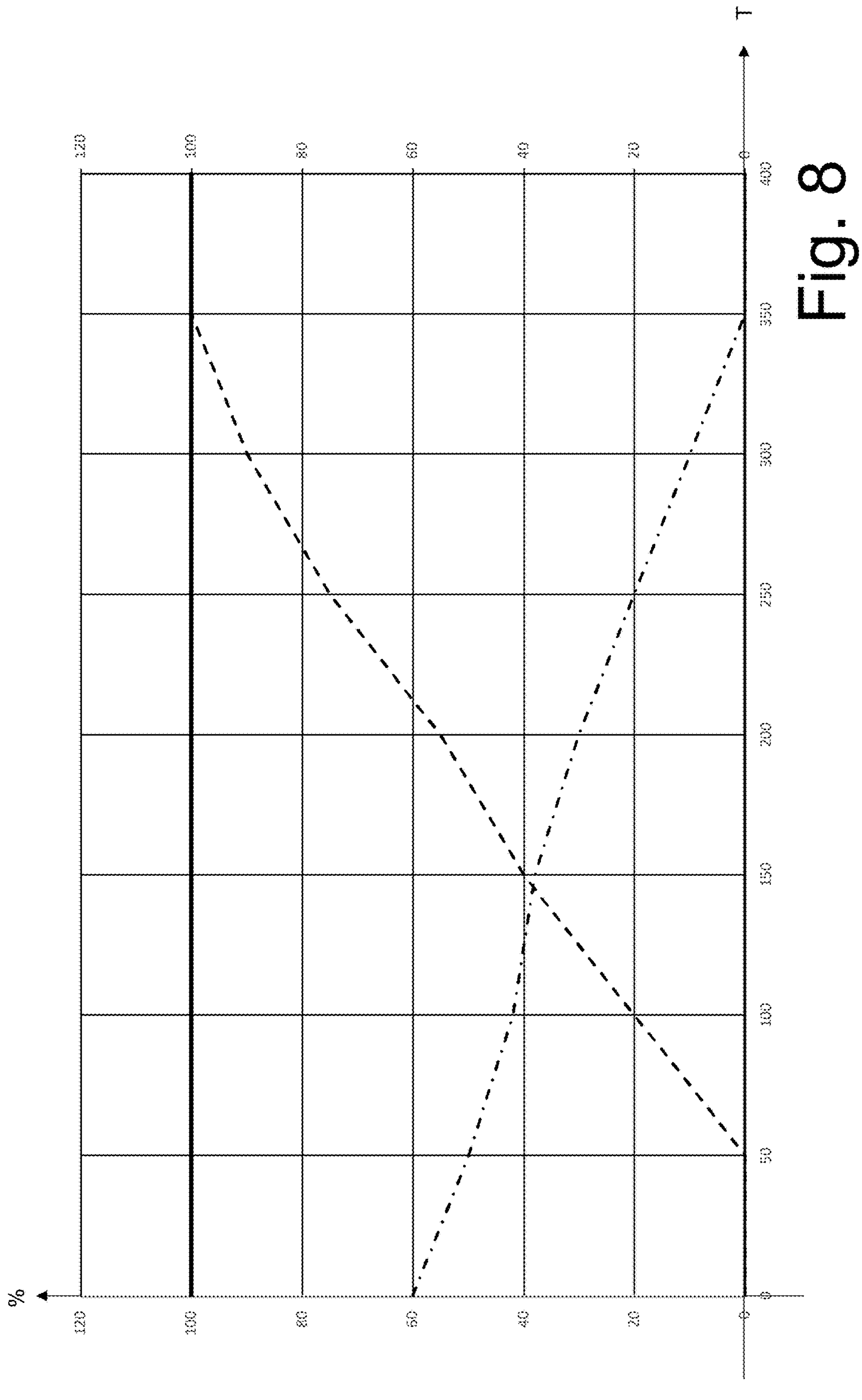

FIG. 8 illustrates a graph in which the throttle arrangement 32, the first exhaust gas recirculation path valve 56 and the second exhaust gas recirculation path valve 72 are controlled in accordance with the intermediate temperature starting procedure presented above. As may be gleaned from the horizontal solid line, the throttle arrangement 32 may assume the open condition throughout the intermediate temperature starting procedure.

Purely by way of example, the ambient temperature range $\Delta T$ may be a half-open range or interval such that $\Delta T=(T_{thres}, T_{up}]$, alternatively an open range or interval such that $\Delta T=(T_{thres}, T_{up})$. As such, the ambient temperature range $\Delta T$ may be such that any temperature above the threshold temperature $T_{thres}$ and which is equal to or below (in the example with the half-open range), alternatively which is below (in the example with the open range) an upper end point $T_{up}$ of the ambient temperature range $\Delta T$ falls within the ambient temperature range $\Delta T$. As a non-limiting example, the upper end point $T_{up}$ may be in the range of 5° to 20° C., alternatively in the range of 8° to 12° C., more than the threshold temperature $T_{thres}$ such that 5° C.≤$T_{up}$−$T_{thres}$≤20° C., alternatively 8° C.≤$T_{up}$−$T_{thres}$≤12° C. Instead of the above example, the upper end point $T_{up}$ may be in the range of −5° to 5° C.

By way of example only, the intermediate temperature starting procedure may commence by controlling the power system so as to assume an intermediate temperature starting initial condition in which:

- the first exhaust gas recirculation path valve is fully closed, and
- the second exhaust gas recirculation path valve is fully closed.

Purely by way of example, the intermediate temperature starting procedure may comprise starting the internal combustion engine and maintaining the intermediate temperature starting initial condition a predetermined delay time after starting the internal combustion engine. A technical benefit may include that the internal combustion engine may be allowed to be started in an appropriate manner before e.g. starting to controlling the throttle arrangement or the first exhaust gas recirculation path valve. As a non-limiting example, the predetermined delay time may be in the range of 0.1-5 seconds, for example in the range of 2-4 seconds.

Figure 9:
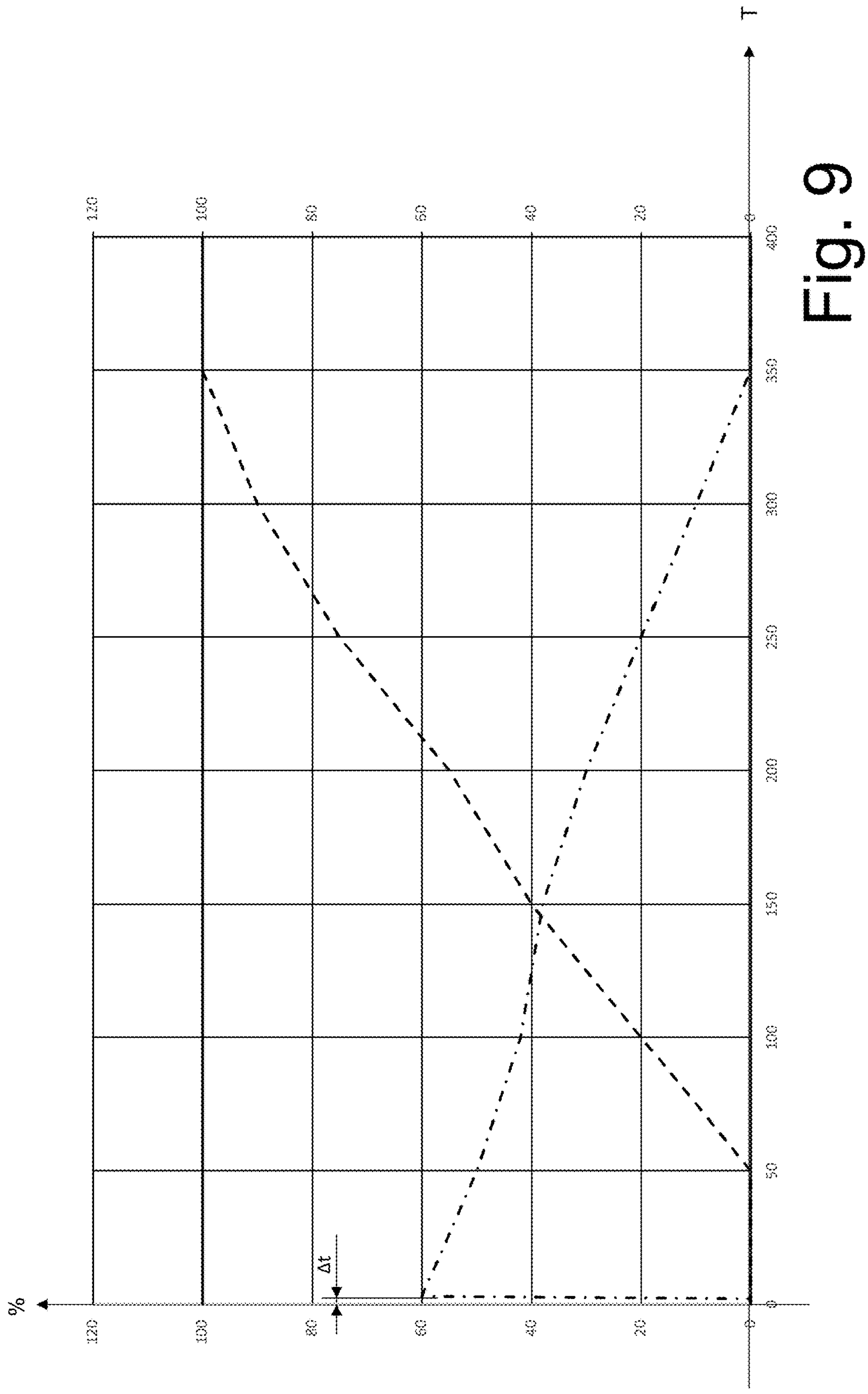

FIG. 9 illustrates a graph in which the throttle arrangement 32, the first exhaust gas recirculation path valve 56 and the second exhaust gas recirculation path valve 72 are controlled in accordance with the intermediate temperature starting procedure, comprising the intermediate temperature starting initial condition, as presented above. As may be gleaned from the horizontal solid line, the throttle arrangement 32 may again assume the open condition throughout the intermediate temperature starting procedure. In the FIG. 9 graph, 2 seconds is used as an example of the delay time Δt.

For examples of the present disclosure which comprises controlling the second exhaust gas recirculation path valve 72 such that an inlet gas temperature in the inlet air conduit assembly is equal to or above an inlet gas temperature threshold value, the method may comprise determining and/or the computer system may be configured to determine the target inlet gas temperature range $\Delta T_{inlet}$ such that each temperature in the target inlet gas temperature range $\Delta T_{inlet}$ is equal to or above a dew point in a portion of the inlet air conduit assembly 26.

Purely by way of example, the dew point may be determined on the basis of one or more of the following parameters: a mass flow of air through the inlet air conduit assembly 26; a mass flow of exhaust gas through the first exhaust gas recirculation path 52; a mass flow of exhaust gas through the second exhaust gas recirculation path 70; the inlet temperature in the inlet air conduit assembly 26, and an inlet pressure in the inlet air conduit assembly 26.

Optionally, in some examples, the target exhaust gas counterpressure range $\Delta P_{exhaust}$ may be determined on the basis of one or more of the following parameters: an engine speed of the internal combustion engine 10, a load of the internal combustion engine 10, the temperature information TI, an exhaust temperature of exhaust gases emitted from the internal combustion engine 10; a coolant temperature of a coolant adapted to cool the internal combustion engine 10, and an aftertreatment temperature of a portion, e.g., a metal portion, of an exhaust gas aftertreatment system 8 adapted to receive exhaust gases from the exhaust gas turbine 18.

Optionally, in some examples, the target nitrogen oxides amount range $\Delta NO_{x,\ target}$ may be determined on the basis of one or more of the following parameters: an engine speed of the internal combustion engine 10, a load of the internal combustion engine 10, the temperature information TI, an exhaust temperature of exhaust gases emitted from the internal combustion engine 10; a coolant temperature of a coolant adapted to cool the internal combustion engine 10, and an aftertreatment temperature of a portion, e.g., a metal portion, of an exhaust gas aftertreatment system 8 adapted to receive exhaust gases from the exhaust gas turbine.

Purely by way of example, the present disclosure may be presented in accordance with any one of the Examples presented hereinbelow.

Example 1: A computer system (6) comprising processing circuitry configured to issue information to start a power system (4), said power system (4) comprising an internal combustion engine (10) and a turbo (14) which in turn comprises an inlet air compressor (16) and an exhaust gas turbine (18), said exhaust gas turbine (18) comprising a turbine wheel (20), said power system (4) comprising an exhaust gas conduit assembly (24) comprising at least one exhaust gas conduit wherein said exhaust gas turbine (18) is adapted to receive exhaust gases from said internal combustion engine (10) via said exhaust gas conduit assembly (24), said power system (4) comprising an inlet air conduit assembly (26) comprising at least one inlet air conduit wherein said internal combustion engine (10) is adapted to receive inlet air from said inlet air compressor (16) via said inlet air conduit assembly (26),

- said power system (4) further comprising a throttle arrangement (32) arranged between said internal combustion engine (10) and said turbine wheel (20), as seen in a direction of flow from said internal combustion engine (10) to said turbine wheel (20), said throttle arrangement (32) being adapted to assume a plurality of different conditions for throttling exhaust gas from said internal combustion engine (10) to said turbine wheel (20), said plurality of different conditions comprising an open condition with a smallest throttling of said exhaust gas amongst said conditions as well as an at least partially closed condition associated with a throttling being larger than said smallest throttling,
- said power system (4) further comprising a first exhaust gas recirculation path (52) connecting a portion of said exhaust gas conduit assembly (24) located upstream said throttle arrangement (32), as seen in a direction of flow from said internal combustion engine (10) to said turbine wheel (20), to a portion of said inlet air conduit assembly (26) located downstream said inlet air compressor (16), as seen in a direction of flow from said inlet air compressor (16) to said internal combustion engine (10),
- said power system (4) further comprising a first exhaust gas recirculation path valve (56) adapted to control at least a flow through said first exhaust gas recirculation path (52); said computer system (6) being configured to:
- receive temperature information (TI) indicative of a temperature ($T_{amb}$) of air ambient of said power system (4), and
- in response to determining that said temperature information (TI) indicates a temperature ($T_{amb}$) of air ambient of said power system (4) being equal to or below a threshold temperature, issue information to said power system (4) to initiate a cold starting procedure comprising the following:
  - controlling said throttle arrangement (32) such that an exhaust gas counterpressure upstream said throttle arrangement (32) is within a target exhaust gas counterpressure range ($\Delta P_{exhaust}$), and controlling said first exhaust gas recirculation path valve (56) such that an amount of nitrogen oxides in exhaust gases emitted from said internal combustion engine (10) is within a target nitrogen oxides amount range ($\Delta NO_{x,\ target}$).

Example 2: The computer system (6) according to Example 1, wherein said cold starting procedure commences by controlling said power system (4) so as to assume a cold starting initial condition comprising that:

said throttle arrangement (32) assumes said open condition, and said first exhaust gas recirculation path valve (56) is fully closed.

Example 3: The computer system (6) according to Example 2, wherein said cold starting procedure comprises starting said internal combustion engine (10) and maintaining said cold starting initial condition a predetermined delay time (Δt) after starting said internal combustion engine (10).

Example 4: The computer system (6) according to any one of Examples 1-3, wherein said power system (4) further comprises a second exhaust gas recirculation path (70) connecting a portion of said exhaust gas conduit assembly (24) located upstream said throttle arrangement (32), as seen in a direction of flow from said internal combustion engine (10) to said turbine wheel (20), to a portion of said inlet air conduit assembly (26) located downstream said inlet air compressor (16), as seen in a direction of flow from said inlet air compressor (16) to said internal combustion engine (10), said first exhaust gas recirculation path (52) being associated with a first cooling capacity for cooling gas flowing through said first exhaust gas recirculation path (52), said second exhaust gas recirculation path (70) being associated with a second cooling capacity for cooling gas flowing through said second exhaust gas recirculation path (70), said second cooling capacity being lower than said first cooling capacity, said power system (4) further comprising a second exhaust gas recirculation path (70) valve adapted to control at least the flow through said second exhaust gas recirculation path (70);

said cold starting procedure further comprising the following:

controlling said second exhaust gas recirculation path (70) valve such that an inlet gas temperature in said inlet air conduit assembly (26) is within a target inlet gas temperature range ($\Delta T_{inlet}$).

Example 5: The computer system (6) according to Example 4, when dependent on Example 2, wherein said cold starting initial condition further comprises that:

said second exhaust gas recirculation path (70) valve is fully closed.

Example 6: The computer system (6) according to Examples 3-5, wherein said method comprises, in response to determining that said temperature information (TI) indicates a temperature ($T_{amb}$) of air ambient of said power system (4) within an ambient temperature range, wherein each temperature in said an ambient temperature range is above said threshold temperature, initiating an intermediate temperature starting procedure comprising the following:

controlling said throttle arrangement (32) so as to assume said open condition;

controlling said second exhaust gas recirculation path (70) valve such that an inlet gas temperature in said inlet air conduit assembly (26) is equal to or above an inlet gas temperature threshold value, and controlling said first exhaust gas recirculation path valve (56) such that an amount of nitrogen oxides in exhaust gases at a position downstream said internal combustion engine (10) is equal to or below a nitrogen oxides amount threshold value.

Example 7: The computer system (6) according to Example 6, wherein said intermediate temperature starting procedure commences by controlling said power system (4) so as to assume an intermediate temperature starting initial condition in which:

said first exhaust gas recirculation path valve (56) is fully closed, and said second exhaust gas recirculation path (70) valve is fully closed.

Example 8: The computer system (6) according to Example 7, wherein said intermediate temperature starting procedure comprises starting said internal combustion engine (10) and maintaining said intermediate temperature starting initial condition a predetermined delay time (Δt) after starting said internal combustion engine (10).

Example 9: The computer system (6) according to any one of Examples 4-8, wherein said method comprises determining said target inlet gas temperature range ($\Delta T_{inlet}$) such that each temperature in said target inlet gas temperature range ($\Delta T_{inlet}$) is equal to or above a dew point in a portion of said inlet air conduit assembly (26).

Example 10: The computer system (6) according to Example 9, wherein said dew point is determined on the basis of one or more of the following parameters: a mass flow of air through said inlet air conduit assembly (26); a mass flow of exhaust gas through said first exhaust gas recirculation path (52); a mass flow of exhaust gas through said second exhaust gas recirculation path (70); said inlet temperature in said inlet air conduit assembly (26), and an inlet pressure in said inlet air conduit assembly (26).

Example 11: The computer system (6) according to any one of Examples 1-10, wherein said target exhaust gas counterpressure range ($\Delta P_{exhaust}$) is determined on the basis of one or more of the following parameters: an engine speed of said internal combustion engine (10), a load of said internal combustion engine (10), said temperature information (TI), an exhaust temperature of exhaust gases emitted from said internal combustion engine (10); a coolant temperature of a coolant adapted to cool said internal combustion engine (10), and an aftertreatment temperature of a portion, preferably a metal portion, of an exhaust gas aftertreatment system adapted to receive exhaust gases from said exhaust gas turbine (18).

Example 12: The computer system (6) according to any one of Examples 1-11, wherein said target nitrogen oxides amount range ($\Delta NO_{x,\ target}$) is determined on the basis of one or more of the following parameters: an engine speed of said internal combustion engine (10), a load of said internal combustion engine (10), said temperature information (TI), an exhaust temperature of exhaust gases emitted from said internal combustion engine (10); a coolant temperature of a coolant adapted to cool said internal combustion engine (10), and an aftertreatment temperature of a portion, preferably a metal portion, of an exhaust gas aftertreatment system adapted to receive exhaust gases from said exhaust gas turbine (18).

Example 13: The computer system (6) according to any one of Examples 1-12, comprising determining said amount of nitrogen oxides in exhaust gases emitted from said internal combustion engine (10) by determining an amount of nitrogen oxides in exhaust gases in a portion of said exhaust gas conduit assembly (24).

Example 14: The computer system (6) according to any one of Examples 1-13, wherein said exhaust gas turbine (18) comprises an exhaust gas turbine housing (34) enclosing said turbine wheel (20), said throttle arrangement (32) comprises a pre-turbine throttle (36) arranged between said internal combustion engine (10) and said exhaust gas turbine housing (34), as seen in a direction of flow from said internal combustion engine (10) to said turbine wheel (20).

Example 15: A method for starting a power system (4), said power system (4) comprising an internal combustion engine (10) and a turbo (14) which in turn comprises an inlet air compressor (16) and an exhaust gas turbine (18), said exhaust gas turbine (18) comprising a turbine wheel (20), said power system (4) comprising an exhaust gas conduit assembly (24) comprising at least one exhaust gas conduit wherein said exhaust gas turbine (18) is adapted to receive exhaust gases from said internal combustion engine (10) via said exhaust gas conduit assembly (24), said power system (4) comprising an inlet air conduit assembly (26) comprising at least one inlet air conduit wherein said internal combustion engine (10) is adapted to receive inlet air from said inlet air compressor (16) via said inlet air conduit assembly (26), said power system (4) further comprising a throttle arrangement (32) arranged between said internal combustion engine (10) and said turbine wheel (20), as seen in a direction of flow from said internal combustion engine (10) to said turbine wheel (20), said throttle arrangement (32) being adapted to assume a plurality of different conditions for throttling exhaust gas from said internal combustion engine (10) to said turbine wheel (20), said plurality of different conditions comprising an open condition with a smallest throttling of said exhaust gas amongst said conditions as well as an at least partially closed condition associated with a throttling being larger than said smallest throttling, said power system (4) further comprising a first exhaust gas recirculation path (52) connecting a portion of said exhaust gas conduit assembly (24) located upstream said throttle arrangement (32), as seen in a direction of flow from said internal combustion engine (10) to said turbine wheel (20), to a portion of said inlet air conduit assembly (26) located downstream said inlet air compressor (16), as seen in a direction of flow from said inlet air compressor (16) to said internal combustion engine (10), said power system (4) further comprising a first exhaust gas recirculation path valve (56) adapted to control at least a flow through said first exhaust gas recirculation path (52); said method comprising:

detecting temperature information (TI) indicative of a temperature ($T_{amb}$) of air ambient of said power system (4), and in response to determining that said temperature information (TI) indicates a temperature ($T_{amb}$) of air ambient of said power system (4) being equal to or below a threshold temperature, initiating a cold starting procedure comprising the following:

controlling said throttle arrangement (32) such that an exhaust gas counterpressure upstream said throttle arrangement (32) is within a target exhaust gas counterpressure range ($\Delta P_{exhaust}$), and controlling said first exhaust gas recirculation path valve (56) such that an amount of nitrogen oxides in exhaust gases emitted from said internal combustion engine (10) is within a target nitrogen oxides amount range ($\Delta NO_{x,\ target}$).

Example 16: The method according to Example 15, wherein said cold starting procedure commences by controlling said power system (4) so as to assume a cold starting initial condition comprising that:

said throttle arrangement (32) assumes said open condition, and said first exhaust gas recirculation path valve (56) is fully closed.

Example 17: The method according to Example 16, wherein said cold starting procedure comprises starting said internal combustion engine (10) and maintaining said cold starting initial condition a predetermined delay time ($\Delta t$) after starting said internal combustion engine (10).

Example 18: The method according to any one of Examples 15-17, wherein said power system (4) further comprises a second exhaust gas recirculation path (70) connecting a portion of said exhaust gas conduit assembly (24) located upstream said throttle arrangement (32), as seen in a direction of flow from said internal combustion engine (10) to said turbine wheel (20), to a portion of said inlet air conduit assembly (26) located downstream said inlet air compressor (16), as seen in a direction of flow from said inlet air compressor (16) to said internal combustion engine (10), said first exhaust gas recirculation path (52) being associated with a first cooling capacity for cooling gas flowing through said first exhaust gas recirculation path (52), said second exhaust gas recirculation path (70) being associated with a second cooling capacity for cooling gas flowing through said second exhaust gas recirculation path (70), said second cooling capacity being lower than said first cooling capacity, said power system (4) further comprising a second exhaust gas recirculation path (70) valve adapted to control at least the flow through said second exhaust gas recirculation path (70); said cold starting procedure further comprising the following:

controlling said second exhaust gas recirculation path (70) valve such that an inlet gas temperature in said inlet air conduit assembly (26) is within a target inlet gas temperature range ($\Delta T_{inlet}$).

Example 19: The method according to Example 18, when dependent on Example 16, wherein said cold starting initial condition further comprises that:

said second exhaust gas recirculation path (70) valve is fully closed.

Example 20: The method according to any one of Examples 17 to 19, wherein said method comprises, in response to determining that said temperature information (TI) indicates a temperature ($T_{amb}$) of air ambient of said power system (4) within an ambient temperature range, wherein each temperature in said an ambient temperature range is above said threshold temperature, initiating an intermediate temperature starting procedure comprising the following:

controlling said throttle arrangement (32) so as to assume said open condition;

controlling said second exhaust gas recirculation path (70) valve such that an inlet gas temperature in said inlet air conduit assembly (26) is equal to or above an inlet gas temperature threshold value, and controlling said first exhaust gas recirculation path valve (56) such that an amount of nitrogen oxides in exhaust gases at a position downstream said internal combustion engine (10) is equal to or below a nitrogen oxides amount threshold value.

Example 21: The method according to Example 20, wherein said intermediate temperature starting procedure commences by controlling said power system (4) so as to assume an intermediate temperature starting initial condition in which:

said first exhaust gas recirculation path valve (56) is fully closed, and said second exhaust gas recirculation path (70) valve is fully closed.

Example 22: The method according to Example 21, wherein said intermediate temperature starting procedure comprises starting said internal combustion engine (10) and maintaining said intermediate temperature starting initial condition a predetermined delay time ($\Delta t$) after starting said internal combustion engine (10).

Example 23: The method according to any one of Examples 18-22, wherein said method comprises determining said target inlet gas temperature range ($\Delta T_{inlet}$) such that each temperature in said target inlet gas temperature range ($\Delta T_{inlet}$) is equal to or above a dew point in a portion of said inlet air conduit assembly (26).

Example 24: The method according to Example 23, wherein said dew point is determined on the basis of one or more of the following parameters: a mass flow of air through said inlet air conduit assembly (26); a mass flow of exhaust gas through said first exhaust gas recirculation path (52); a mass flow of exhaust gas through said second exhaust gas recirculation path (70); said inlet temperature in said inlet air conduit assembly (26), and an inlet pressure in said inlet air conduit assembly (26).

Example 25: The method according to any one of Examples 15-24, wherein said target exhaust gas counter-pressure range ($\Delta P_{exhaust}$) is determined on the basis of one or more of the following parameters: an engine speed of said internal combustion engine (10), a load of said internal combustion engine (10), said temperature information (TI), an exhaust temperature of exhaust gases emitted from said internal combustion engine (10); a coolant temperature of a coolant adapted to cool said internal combustion engine (10), and an aftertreatment temperature of a portion, preferably a metal portion, of an exhaust gas aftertreatment system adapted to receive exhaust gases from said exhaust gas turbine (18).

Example 26: The method according to any one of Examples 15-25, wherein said target nitrogen oxides amount range ($\Delta NO_{x,\ target}$) is determined on the basis of one or more of the following parameters: an engine speed of said internal combustion engine (10), a load of said internal combustion engine (10), said temperature information (TI), an exhaust temperature of exhaust gases emitted from said internal combustion engine (10); a coolant temperature of a coolant adapted to cool said internal combustion engine (10), and an aftertreatment temperature of a portion, preferably a metal portion, of an exhaust gas aftertreatment system adapted to receive exhaust gases from said exhaust gas turbine (18).

Example 27: The method according to any one of Examples 15-26, comprising determining said amount of nitrogen oxides in exhaust gases emitted from said internal combustion engine (10) by determining an amount of nitrogen oxides in exhaust gases in a portion of said exhaust gas conduit assembly (24).

Example 28: The method according to any one of Examples 15-27, wherein said exhaust gas turbine (18) comprises an exhaust gas turbine housing (34) enclosing said turbine wheel (20), said throttle arrangement (32) comprises a pre-turbine throttle (36) arranged between said internal combustion engine (10) and said exhaust gas turbine housing (34), as seen in a direction of flow from said internal combustion engine (10) to said turbine wheel (20).

Example 29: A computer program product comprising program code for performing, when executed by processing circuitry of a computer system (6), the method of any of Examples 15-28.

Example 30: A non-transitory computer-readable storage medium comprising instructions, which when executed by processing circuitry of a computer system (6), cause the processing circuitry to perform the method of any of Examples 15-28.

The terminology used herein is for the purpose of describing particular aspects only and is not intended to be limiting of the disclosure. As used herein, the singular forms "a", "an", and "the" are intended to include the plural forms as well, unless the context clearly indicates otherwise. As used herein, the term "and/or" includes any and all combinations of one or more of the associated listed items. It will be further understood that the terms "comprises", "comprising", "includes", and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to issue information to start a power system, the power system comprising an internal combustion engine and a turbo which in turn comprises an inlet air compressor and an exhaust gas turbine, the exhaust gas turbine comprising a turbine wheel, the power system comprising an exhaust gas conduit assembly comprising at least one exhaust gas conduit wherein the exhaust gas turbine is adapted to receive exhaust gases from the internal combustion engine via the exhaust gas conduit assembly, the power system comprising an inlet air conduit assembly comprising at least one inlet air conduit wherein the internal combustion engine is adapted to receive inlet air from the inlet air compressor via the inlet air conduit assembly, the power system further comprising a throttle arrangement arranged between the internal combustion engine and the turbine wheel, as seen in a direction of flow from the internal combustion engine to the turbine wheel, the throttle arrangement being adapted to assume a plurality of different conditions for throttling exhaust gas from the internal combustion engine to the turbine wheel, the plurality of different conditions comprising an open condition with a smallest throttling of the exhaust gas amongst the plurality of different conditions as well as an at least partially closed condition associated with a throttling being larger than the smallest throttling, the power system further comprising a first exhaust gas recirculation path connecting a portion of the exhaust gas conduit assembly located upstream the throttle arrangement, as seen in a direction of flow from the internal combustion engine to the turbine wheel, to a portion of the inlet air conduit assembly located downstream the inlet air compressor, as seen in a direction of flow from the inlet air compressor to the internal combustion engine, the power system further comprising a first exhaust gas recirculation path valve adapted to control at least a flow through the first exhaust gas recirculation path;

the computer system being configured to:

receive temperature information (TI) indicative of an ambient air temperature of the power system, and in response to determining that the TI indicates the ambient air temperature of the power system being equal to or below a threshold temperature, issue information to the power system to initiate a cold starting procedure comprising:

controlling the throttle arrangement such that an exhaust gas counterpressure upstream the throttle arrangement is within a target exhaust gas counterpressure range ($\Delta P_{exhaust}$), and controlling the first exhaust gas recirculation path valve such that an amount of nitrogen oxides in exhaust gases emitted from the internal combustion engine is within a target nitrogen oxides amount range ($\Delta NO_{x,target}$), wherein the cold starting procedure commences by controlling the power system so as to assume a cold starting initial condition comprising that:

the throttle arrangement assumes the open condition, and the first exhaust gas recirculation path valve is fully closed.

2. A method for starting a power system, the power system comprising an internal combustion engine and a turbo which in turn comprises an inlet air compressor and an exhaust gas turbine, the exhaust gas turbine comprising a turbine wheel, the power system comprising an exhaust gas conduit assembly comprising at least one exhaust gas conduit wherein the exhaust gas turbine is adapted to receive exhaust gases from the internal combustion engine via the exhaust gas conduit assembly, the power system comprising an inlet air conduit assembly comprising at least one inlet air conduit wherein the internal combustion engine is adapted to receive inlet air from the inlet air compressor via the inlet air conduit assembly, the power system further comprising a throttle arrangement arranged between the internal combustion engine and the turbine wheel, as seen in a direction of flow from the internal combustion engine to the turbine wheel, the throttle arrangement being adapted to assume a plurality of different conditions for throttling exhaust gas from the internal combustion engine to the turbine wheel, the plurality of different conditions comprising an open condition with a smallest throttling of the exhaust gas amongst the plurality of different conditions as well as an at least partially closed condition associated with a throttling being larger than the smallest throttling, the power system further comprising a first exhaust gas recirculation path connecting a portion of the exhaust gas conduit assembly located upstream the throttle arrangement, as seen in a direction of flow from the internal combustion engine to the turbine wheel, to a portion of the inlet air conduit assembly located downstream the inlet air compressor, as seen in a direction of flow from the inlet air compressor to the internal combustion engine, the power system further comprising a first exhaust gas recirculation path valve adapted to control at least a flow through the first exhaust gas recirculation path;

the method comprising:

detecting temperature information (TI) indicative of an ambient air temperature of the power system, and in response to determining that the TI indicates the ambient air temperature of the power system being equal to or below a threshold temperature, initiating a cold starting procedure comprising:

controlling the throttle arrangement such that an exhaust gas counterpressure upstream the throttle arrangement is within a target exhaust gas counterpressure range, and controlling the first exhaust gas recirculation path valve such that an amount of nitrogen oxides in exhaust gases emitted from the internal combustion engine is within a target nitrogen oxides amount range, wherein the cold starting procedure commences by controlling the power system so as to assume a cold starting initial condition comprising that:

the throttle arrangement assumes the open condition, and the first exhaust gas recirculation path valve is fully closed.

3. The method according to claim 2, wherein the cold starting procedure comprises starting the internal combustion engine and maintaining the cold starting initial condition a predetermined delay time after starting the internal combustion engine.

4. The method according to claim 2, wherein the power system further comprises a second exhaust gas recirculation path connecting a portion of the exhaust gas conduit assembly located upstream the throttle arrangement, as seen in a direction of flow from the internal combustion engine to the turbine wheel, to a portion of the inlet air conduit assembly located downstream the inlet air compressor, as seen in a direction of flow from the inlet air compressor to the internal combustion engine, the first exhaust gas recirculation path being associated with a first cooling capacity for cooling gas flowing through the first exhaust gas recirculation path, the second exhaust gas recirculation path being associated with a second cooling capacity for cooling gas flowing through the second exhaust gas recirculation path, the second cooling capacity being lower than the first cooling capacity, the power system further comprising a second exhaust gas recirculation path valve adapted to control at least the flow through the second exhaust gas recirculation path;

the cold starting procedure further comprising:

controlling the second exhaust gas recirculation path valve such that an inlet gas temperature in the inlet air conduit assembly is within a target inlet gas temperature range.

5. The method according to claim 4, wherein the cold starting initial condition further comprises that:

the second exhaust gas recirculation path valve is fully closed.

6. The method according to claim 4, wherein the method comprises, in response to determining that the TI indicates the ambient air temperature of the power system within an ambient temperature range, wherein each temperature in the ambient temperature range is above the threshold temperature, initiating an intermediate temperature starting procedure comprising:

controlling the throttle arrangement so as to assume the open condition;

controlling the second exhaust gas recirculation path valve such that an inlet gas temperature in the inlet air conduit assembly is equal to or above an inlet gas temperature threshold value, and controlling the first exhaust gas recirculation path valve such that an amount of nitrogen oxides in exhaust gases at a position downstream the internal combustion engine is equal to or below a nitrogen oxides amount threshold value.

7. The method according to claim 6, wherein the intermediate temperature starting procedure commences by controlling the power system so as to assume an intermediate temperature starting initial condition in which:

the first exhaust gas recirculation path valve is fully closed, and the second exhaust gas recirculation path valve is fully closed.

8. The method according to claim 7, wherein the intermediate temperature starting procedure comprises starting the internal combustion engine and maintaining the intermediate temperature starting initial condition a predetermined delay time after starting the internal combustion engine.

9. The method according to claim 4, wherein the method comprises determining the target inlet gas temperature range such that each temperature in the target inlet gas temperature range is equal to or above a dew point in a portion of the inlet air conduit assembly; the inlet gas temperature in the inlet air conduit assembly, and an inlet pressure in the inlet air conduit assembly.

10. The method according to claim 9, wherein the dew point is determined based on one or more of the following parameters: a mass flow of air through the inlet air conduit assembly; a mass flow of exhaust gas through the first exhaust gas recirculation path; a mass flow of exhaust gas through the second exhaust gas recirculation path.

11. The method according to claim 2, wherein the target exhaust gas counterpressure range is determined based on one or more of the following parameters: an engine speed of the internal combustion engine, a load of the internal combustion engine, the TI, an exhaust temperature of exhaust gases emitted from the internal combustion engine; a coolant temperature of a coolant adapted to cool the internal combustion engine, and an aftertreatment temperature of a portion of an exhaust gas aftertreatment system adapted to receive exhaust gases from the exhaust gas turbine.

12. The method according to claim 2, wherein the target nitrogen oxides amount range is determined based on one or more of the following parameters: an engine speed of the internal combustion engine, a load of the internal combustion engine, the TI, an exhaust temperature of exhaust gases emitted from the internal combustion engine; a coolant temperature of a coolant adapted to cool the internal combustion engine, and an aftertreatment temperature of a portion of an exhaust gas aftertreatment system adapted to receive exhaust gases from the exhaust gas turbine.

13. The method according to claim 12, wherein the portion of the exhaust gas aftertreatment system includes a metal portion.

14. The method according to claim 2, comprising determining the amount of nitrogen oxides in exhaust gases emitted from the internal combustion engine by determining an amount of nitrogen oxides in exhaust gases in a portion of the exhaust gas conduit assembly.

15. The method according to claim 2, wherein the exhaust gas turbine comprises an exhaust gas turbine housing enclosing the turbine wheel, the throttle arrangement comprises a pre-turbine throttle arranged between the internal combustion engine and the exhaust gas turbine housing, as seen in a direction of flow from the internal combustion engine to the turbine wheel.

16. A computer program product comprising program code for performing, when executed by processing circuitry of a computer system, the method of claim 2.

17. A non-transitory computer-readable storage medium comprising instructions, which when executed by processing circuitry of a computer system, cause the processing circuitry to perform the method of claim 2.

18. A method for starting a power system, the power system comprising an internal combustion engine and a turbo which in turn comprises an inlet air compressor and an exhaust gas turbine, the exhaust gas turbine comprising a turbine wheel, the power system comprising an exhaust gas conduit assembly comprising at least one exhaust gas conduit wherein the exhaust gas turbine is adapted to receive exhaust gases from the internal combustion engine via the exhaust gas conduit assembly, the power system comprising an inlet air conduit assembly comprising at least one inlet air conduit wherein the internal combustion engine is adapted to receive inlet air from the inlet air compressor via the inlet air conduit assembly, the power system further comprising a throttle arrangement arranged between the internal combustion engine and the turbine wheel, as seen in a direction of flow from the internal combustion engine to the turbine wheel, the throttle arrangement being adapted to assume a plurality of different conditions for throttling exhaust gas from the internal combustion engine to the turbine wheel, the plurality of different conditions comprising an open condition with a smallest throttling of the exhaust gas amongst the plurality of different conditions as well as an at least partially closed condition associated with a throttling being larger than the smallest throttling, the power system further comprising a first exhaust gas recirculation path connecting a portion of the exhaust gas conduit assembly located upstream the throttle arrangement, as seen in a direction of flow from the internal combustion engine to the turbine wheel, to a portion of the inlet air conduit assembly located downstream the inlet air compressor, as seen in a direction of flow from the inlet air compressor to the internal combustion engine, the power system further comprising a first exhaust gas recirculation path valve adapted to control at least a flow through the first exhaust gas recirculation path;

the method comprising:

detecting temperature information (TI) indicative of an ambient air temperature of the power system, and in response to determining that the TI indicates the ambient air temperature of the power system being equal to or below a threshold temperature, initiating a cold starting procedure comprising:

controlling the throttle arrangement such that an exhaust gas counterpressure upstream the throttle arrangement is within a target exhaust gas counterpressure range, and controlling the first exhaust gas recirculation path valve such that an amount of nitrogen oxides in exhaust gases emitted from the internal combustion engine is within a target nitrogen oxides amount range, wherein the target exhaust gas counterpressure range is determined based on one or more of the following parameters: an engine speed of the internal combustion engine, a load of the internal combustion engine, the TI, an exhaust temperature of exhaust gases emitted from the internal combustion engine; a coolant temperature of a coolant adapted to cool the internal combustion engine, and an aftertreatment temperature of a portion of an exhaust gas aftertreatment system adapted to receive exhaust gases from the exhaust gas turbine.

19. A method for starting a power system, the power system comprising an internal combustion engine and a turbo which in turn comprises an inlet air compressor and an exhaust gas turbine, the exhaust gas turbine comprising a turbine wheel, the power system comprising an exhaust gas conduit assembly comprising at least one exhaust gas conduit wherein the exhaust gas turbine is adapted to receive exhaust gases from the internal combustion engine via the exhaust gas conduit assembly, the power system comprising an inlet air conduit assembly comprising at least one inlet air conduit wherein the internal combustion engine is adapted to receive inlet air from the inlet air compressor via the inlet air conduit assembly, the power system further comprising a throttle arrangement arranged between the internal combustion engine and the turbine wheel, as seen in a direction of flow from the internal combustion engine to the turbine wheel, the throttle arrangement being adapted to assume a plurality of different conditions for throttling exhaust gas from the internal combustion engine to the turbine wheel, the plurality of different conditions comprising an open condition with a smallest throttling of the exhaust gas amongst the plurality of different conditions as well as an at least partially closed condition associated with a throttling being larger than the smallest throttling, the power system further comprising a first exhaust gas recirculation path connecting a portion of the exhaust gas conduit assembly located upstream the throttle arrangement, as seen in a direction of flow from the internal combustion engine to the turbine wheel, to a portion of the inlet air conduit assembly located downstream the inlet air compressor, as seen in a direction of flow from the inlet air compressor to the internal combustion engine, the power system further comprising a first exhaust gas recirculation path valve adapted to control at least a flow through the first exhaust gas recirculation path;

the method comprising:

detecting temperature information (TI) indicative of an ambient air temperature of the power system, and in response to determining that the TI indicates the ambient air temperature of the power system being equal to or below a threshold temperature, initiating a cold starting procedure comprising:

controlling the throttle arrangement such that an exhaust gas counterpressure upstream the throttle arrangement is within a target exhaust gas counterpressure range, and controlling the first exhaust gas recirculation path valve such that an amount of nitrogen oxides in exhaust gases emitted from the internal combustion engine is within a target nitrogen oxides amount range, wherein the target nitrogen oxides amount range is determined based on one or more of the following parameters: an engine speed of the internal combustion engine, a load of the internal combustion engine, the TI, an exhaust temperature of exhaust gases emitted from the internal combustion engine; a coolant temperature of a coolant adapted to cool the internal combustion engine, and an aftertreatment temperature of a portion of an exhaust gas aftertreatment system adapted to receive exhaust gases from the exhaust gas turbine.

* * * * *